US010021161B2

(12) United States Patent
Makar et al.

(10) Patent No.: US 10,021,161 B2
(45) Date of Patent: Jul. 10, 2018

(54) COMPRESSION OF GRAPHICAL COMMANDS FOR REMOTE DISPLAY

(71) Applicant: QUALCOMM Incorporated, San Diego, CA (US)

(72) Inventors: Mina Ayman Saleh Yanni Makar, San Diego, CA (US); Hongyu Jiang, San Diego, CA (US); Vijayalakshmi Rajasundaram Raveendran, San Diego, CA (US)

(73) Assignee: QUALCOMM Incorporated, San Diego ( * ) Notice: Subject to any disclaimer, the term of this patent is extended or adjusted under 35 U.S.C. 154(b) by 850 days.

(21) Appl. No.: 14/533,933

(22) Filed: Nov. 5, 2014

(65) Prior Publication Data

US 2016/0127443 A1 May 5, 2016

(51) Int. Cl.
*H04L 29/06* (2006.01)
*G06T 9/00* (2006.01)
*H04N 19/503* (2014.01)
*H04N 19/46* (2014.01)

(52) U.S. Cl.
CPC ............ *H04L 65/607* (2013.01); *G06T 9/004* (2013.01); *H04L 65/4069* (2013.01); *H04L 65/602* (2013.01); *H04L 69/04* (2013.01); *H04N 19/46* (2014.11); *H04N 19/503* (2014.11)

(58) Field of Classification Search
CPC ......... G06T 9/00; G06T 9/004; G06F 9/3851; G09G 5/363; H04L 65/602; H04L 65/607; H04L 69/04; H04N 19/46

USPC .................. 345/522; 382/232, 236
See application file for complete search history.

(56) References Cited

U.S. PATENT DOCUMENTS

| 5,315,696 | A | 5/1994 | Case et al. |
| 6,809,735 | B1 | 10/2004 | Stauffer et al. |
| 6,867,781 | B1 | 3/2005 | Van Hook et al. |
| 2003/0140179 | A1* | 7/2003 | Wilt ...................... G06F 9/3851 719/321 |
| 2010/0293248 | A1 | 11/2010 | Kamay et al. |
| 2011/0157196 | A1* | 6/2011 | Nave ...................... G06F 9/4445 345/522 |
| 2011/0206290 | A1* | 8/2011 | Katayama ............ G09G 3/3648 382/250 |
| 2012/0113091 | A1 | 5/2012 | Isaacson |
| 2014/0022266 | A1 | 1/2014 | Metz et al. |

(Continued)

OTHER PUBLICATIONS

Response to Written Opinion dated Jan. 25, 2016, from International Application No. PCT/US2015/055298, filed on Aug. 29, 2016, 6 pp.

(Continued)

*Primary Examiner* — Jacinta M Crawford
(74) *Attorney, Agent, or Firm* — Shumaker & Sieffert, P.A.

(57) ABSTRACT

In one example, a method for transmitting video data includes capturing a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, outputting, by a source device and to a sink device, a compressed version of the current set of graphical command tokens.

28 Claims, 17 Drawing Sheets

(56) References Cited

U.S. PATENT DOCUMENTS

2014/0286584 A1    9/2014    Alfonso

OTHER PUBLICATIONS

Second Written Opinion from International Application No. PCT/US2015/055298, dated Oct. 6, 2016, 9 pp.
Response to Second Written Opinion dated Oct. 6, 2016, from International Application No. PCT/US2015/055298, filed on Dec. 6, 2016, 9 pp.
Third Written Opinion from International Application No. PCT/US2015/055298, dated Jan. 2, 2017, 10 pp.
International Preliminary Report on Patentability from International Application No. PCT/US2015/055298, dated Mar. 13, 2017, 11 pp.
Dwarakinath, "A Fair-Share Scheduler for the Graphics Processing Unit," pp. 1-32, Aug. 2008, 41 pp.
"Universal Serial Bus Device Class Definition for Audio/Video Devices," AV Device Class Overview & AVFunction Definition, Release 1.0, Dec. 7, 2011, 180 pp.
Eisert et al., "Low Delay Streaming of Computer Graphics," IEEE, pp. 2704-2707, Oct. 12-15, 2008, 4 pp.
Eisert et al., "Low Delay Streaming of Computer Graphics," Image Procsessing, Oct. 12-15, 2008, pp. 2704-2707.
International Search Report and Written Opinion from International Application No. PCT/US2015/055298, dated Jan. 25, 2016, 15 pp.

\* cited by examiner

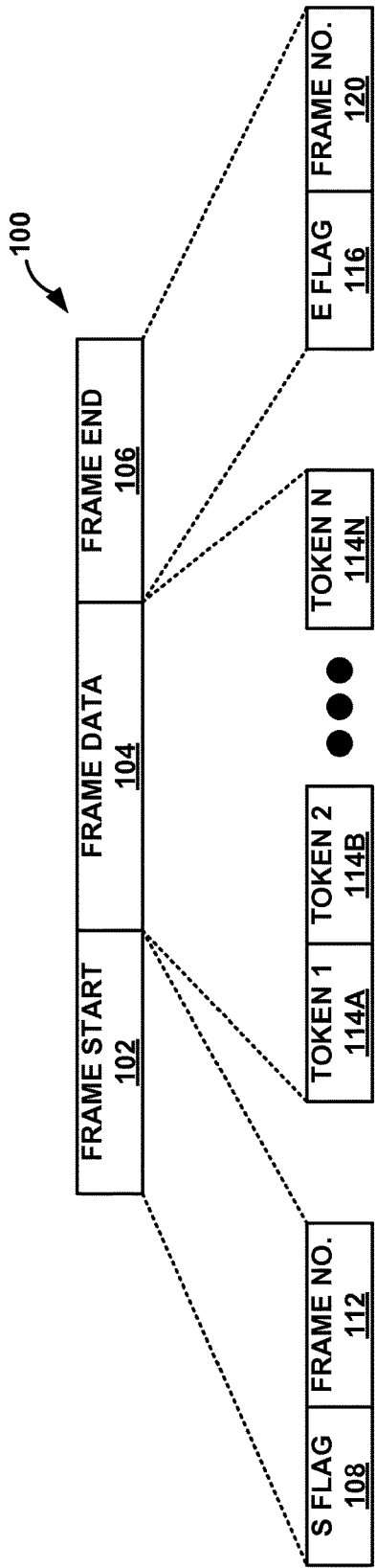
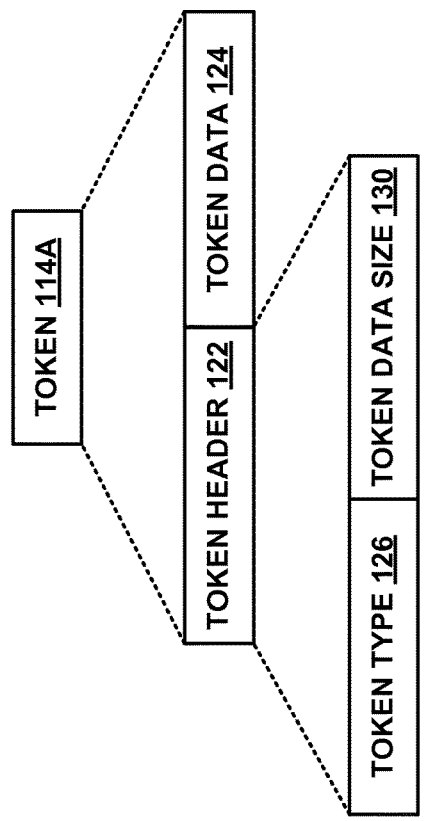
FIG. 1
FIG. 2

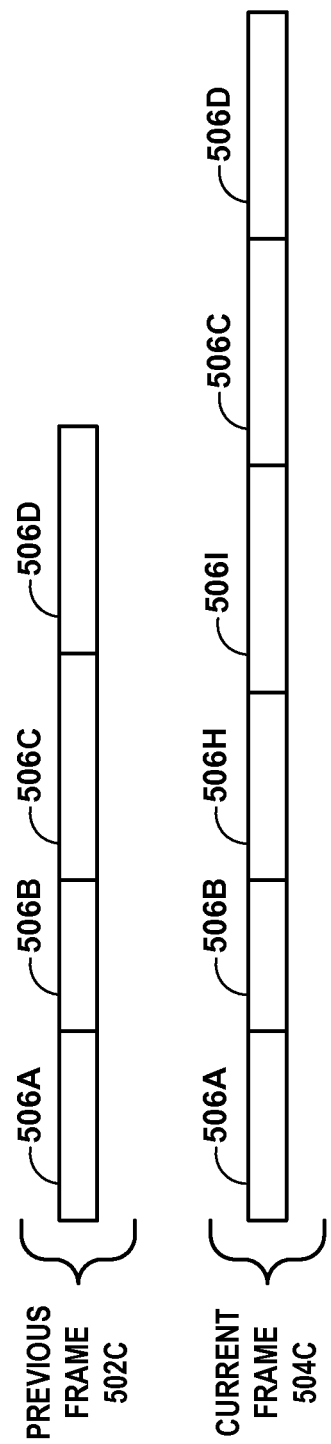

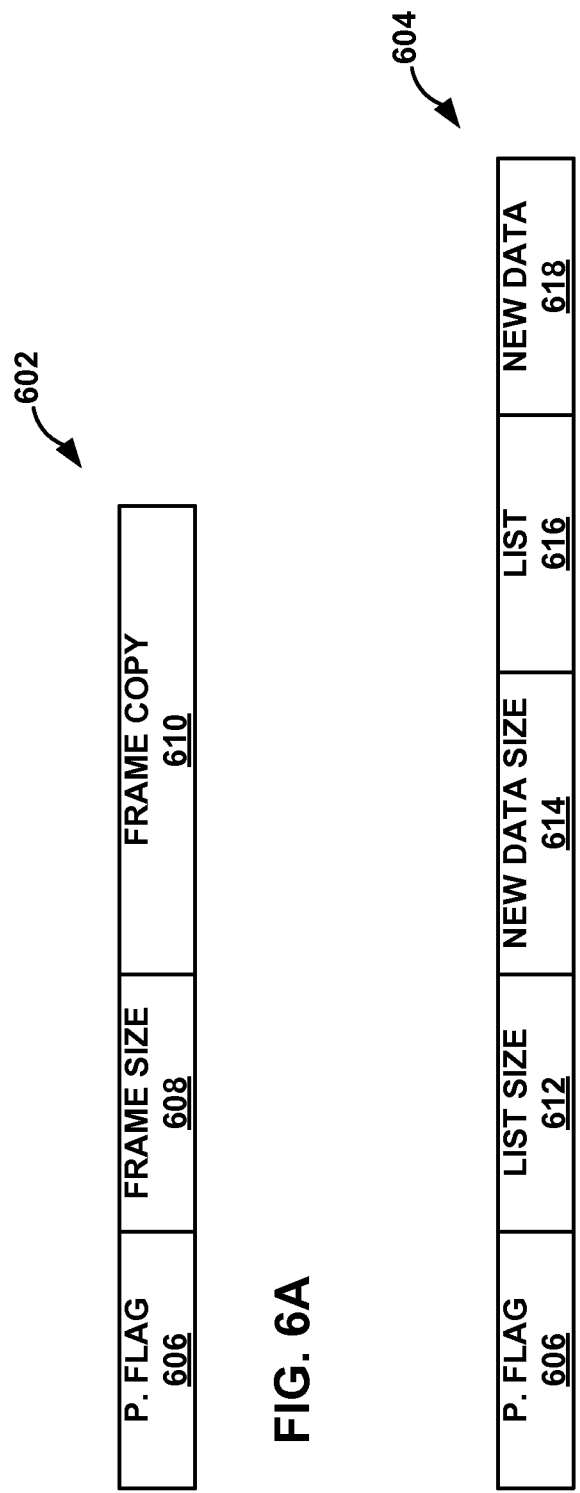

COMPRESSION OF GRAPHICAL COMMANDS FOR REMOTE DISPLAY

TECHNICAL FIELD

This disclosure relates to techniques for streaming video from a source device to a sink device.

BACKGROUND

Wireless display (WD) systems include a source device and one or more sink devices. The source device and each of the sink devices may be either mobile devices or wired devices with wireless communication capabilities. As mobile devices, for example, one or more of the source device and the sink devices may comprise mobile telephones, tablet computers, laptop computers, portable computers with wireless communication cards, personal digital assistants (PDAs), wireless gaming devices, portable media players, or other flash memory devices with wireless communication capabilities. Mobile devices may also include so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment.

SUMMARY

In general, this disclosure describes techniques for transmitting video data from a source device to a sink device using compressed graphical command tokens.

In one example, a method for transmitting video data includes capturing a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, outputting, by a source device and to a sink device a compressed version of the current set of graphical command tokens.

In another example, a source device includes a memory, one or more processors, and at least one module executable by the one or more processors. In this example, the at least one module is executable by the one or more processors to capture a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, output, to a sink device a compressed version of the current set of graphical command tokens.

In another example, a source device includes means for capturing a plurality of sets of graphical command tokens respectively renderable into a plurality of frames of video data; and means for outputting, to a sink device and responsive to determining that a length of a current set of graphical command tokens of the plurality of sets of graphical command tokens is the same as a length of a previous set of the plurality of sets of graphical command tokens, a compressed version of the current set of graphical command tokens.

In another example, a non-transitory computer-readable storage medium stores instructions that, when executed, cause one or more processors of a source device to capture a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, output, to a sink device a compressed version of the current set of graphical command tokens.

In another example, a method for receiving video data includes receiving, by a sink device and from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; responsive to determining, based on the indication of the compression status, that the version of the current set of graphical command tokens is compressed using frame based compression, generating a reconstructed version of the current set of graphical command tokens based on the previous set of graphical command tokens and a received delta between the current set of graphical command tokens and a previous set of graphical command tokens of the plurality of sets of graphical command tokens; and rendering a frame of video data based on the reconstructed version of the current set of graphical command tokens.

In another example, a sink device includes a memory, one or more processors, and at least one module executable by the one or more processors. In this example, the at least one module is executable by the one or more processors to receive, from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; responsive to determining, based on the indication of the compression status, that the version of the current set of graphical command tokens is compressed using frame based compression, generate a reconstructed version of the current set of graphical command tokens based on the previous set of graphical command tokens and a received delta between the current set of graphical command tokens and a previous set of graphical command tokens of the plurality of sets of graphical command tokens; and render a frame of video data based on the reconstructed version of the current set of graphical command tokens.

In another example, a sink device includes means for receiving, from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; means for generating, in response to determining, based on the indication of the compression status, that the version of the current set of graphical command tokens is compressed using frame based compression, a reconstructed version of the current set of graphical command tokens based on the previous set of graphical command tokens and a received delta between the current set of graphical command tokens and a previous set of graphical command tokens of the plurality of sets of graphical command tokens; and means for rendering a frame of video data based on the reconstructed version of the current set of graphical command tokens.

In another example, a non-transitory computer-readable storage medium stores instructions that, when executed, cause one or more processors of a sink device to receive, from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; responsive to determining, based on the indication of the compression status, that the version of the current set of graphical command tokens is compressed using frame based compression, generate a reconstructed version of the current set of graphical command tokens based on the previous set of graphical command tokens and a received delta between the current set of graphical command tokens and a previous set of graphical command tokens of the plurality of sets of graphical command tokens; and render a frame of video data based on the reconstructed version of the current set of graphical command tokens.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram illustrating an example command frame 100 which may be output by a source device to stream video frames to a sink device, in accordance with one or more techniques of this disclosure.

FIG. 2 is a conceptual diagram illustrating further details of one example of a graphical command token, in accordance with one or more techniques of this disclosure.

FIGS. 5A-5C are conceptual diagrams illustrating example sets of tokens which may be analyzed by a source device to perform token based compression, in accordance with one or more techniques of this disclosure.

FIGS. 6A and 6B are conceptual diagrams illustrating example command frames which may be output by a source device to stream video frames to a sink device, in accordance with one or more techniques of this disclosure.

DETAILED DESCRIPTION

Figure 3:
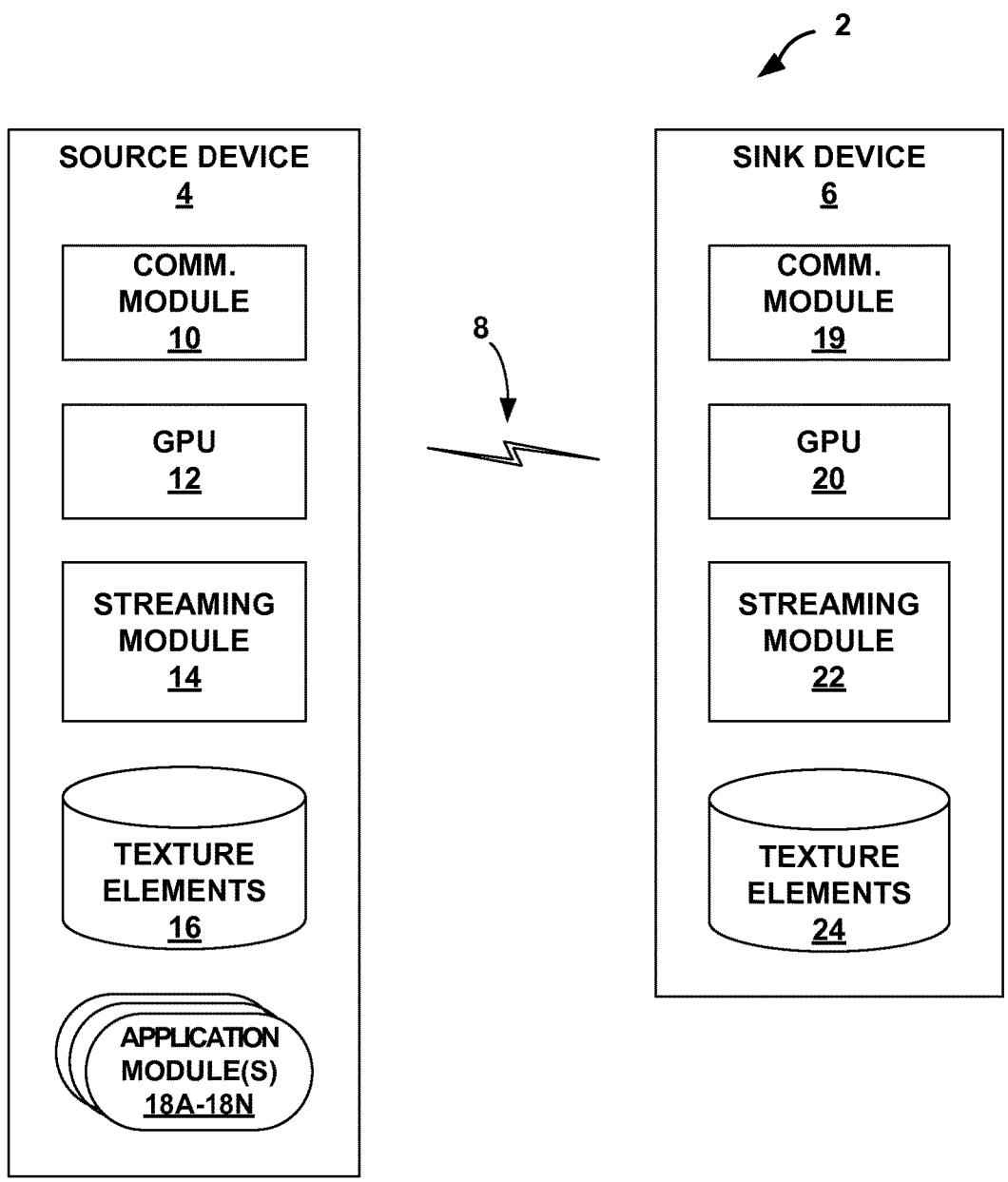
FIG. 3 is a conceptual diagram of an example wireless display (WD) system in which a source device is configured to transmit compressed graphical commands to a sink device over a communication channel, in accordance with one or more techniques of this disclosure.

This disclosure describes techniques for streaming video from a source device to a sink device. In some examples, a source device may stream video to a sink device by capturing constructed frames from a frame buffer of the source device, and transmitting the captured frames to the sink device, which may then displaying the images at a display of the sink device. This method may be referred to as a "pixel domain" transmission method. However, in some examples, it may not be desirable to use the pixel domain method due to the high average data rate required for transmission of the captured images.

Alternatively, in some examples, a "graphics domain" transmission method may be used by a source device to stream deconstructed video frames to a sink device. Graphics domain transmission may be accomplished by capturing display data at an input of a GPU of the source device in the form of graphics command tokens (e.g., tokens of OpenGL commands) and texture elements, transmitting the command tokens and texture elements to the sink device. A GPU of the sink device may render the command tokens and texture elements into displayable frames, and output the rendered frames at the display of the sink device.

In some examples, the graphical command tokens used to render consecutive frames may be similar. For instance, the graphical command tokens used to render frame n may be similar to the graphical command tokens used to render frame n+1. In accordance with one or more techniques of this disclosure, as opposed to transmitting complete graphical command tokens for each frame, a source device may exploit this redundancy to compress the graphical command tokens for one or more frames. In some examples, a source device may compress the graphical command tokens using one or both of predictive frame-based coding and token-based coding. In this way, a source device may reduce the data rate required for transmission of the graphical command tokens.

FIG. 1 is a conceptual diagram illustrating an example command frame 100 which may be output by a source device to stream video frames to a sink device, in accordance with one or more techniques of this disclosure. As illustrated in FIG. 1, command frame 100 includes frame start field 102, frame data field 104, and frame end field 106.

In some examples, frame start field 102 may include start flag 108, and frame number field 112. In some examples, frame start field 102 may indicate the beginning of command frame 100 (i.e., within a data stream). In some examples, frame number field 112 may indicate a sequence number of command frame 100. In some examples, the value of frame number field 112 may increment for subsequent frames. For instance, the value of frame number field 112 may be n for a current frame and n+1 for a next frame.

In some examples, frame data field 102 may include a plurality of graphical command tokens 114A-114N (collectively, "tokens 114"). Each of tokens 114 may correspond to a particular token of a graphical command. Further details of one example of a token of tokens 114 are provided below with reference to FIG. 2.

In some examples, frame end field 106 may include end flag 116, and frame number field 120. In some examples, frame end field 116 may indicate the beginning of frame end field 106 (i.e., within a data stream). In some examples, frame number field 120 may indicate a sequence number of command frame 100.

FIG. 2 is a conceptual diagram illustrating further details of one example of a graphical command token, in accordance with one or more techniques of this disclosure. As illustrated in FIG. 2, token 114A may include token header field 122 and token data field 124.

In some examples, token header field 112 may indicate one or more characteristics of token 114A. In some examples, token header field 112 may be a fixed length, such as 12 bytes. As illustrated in FIG. 2, token header field 112 may include token type 126, and token data size 130. Token type 126 may indicate which graphical command of a set of graphical commands corresponds to token 114A (i.e., which graphical command token 114A is a token of). Token data size 130 may indicate a size of token data field 124 (e.g., in bytes).

Token data field 124 may indicate one or more arguments for token 114A. For instance, if the graphical command type indicated by token type 126 takes two arguments, token data field 124 may include data for the two arguments.

FIG. 3 is a conceptual diagram of an example wireless display (WD) system in which a source device is configured to transmit compressed graphical commands to a sink device over a communication channel, in accordance with one or more techniques of this disclosure. As illustrated in FIG. 3, WD system 2 includes source device 4, sink device 6, and communication channel 8.

Communication channel 8 may be any channel capable of propagating communicative signals between source device 4 and sink device 6. In some examples, communication channel 8 may be a wireless communication channel. For instance, communication channel 8 may be implemented in radio frequency communications in frequency bands such as the 2.4 gigahertz (GHz) band, the 5 GHz band, the 60 GHz band, or other frequency bands. In some examples, communication channel 8 may comply with one or more sets of standards, protocols, or technologies such as universal serial bus (USB) (as promoted by the USB Implementers Forum), Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

WD 2 may include source device 4 which may be configured to transmit video data in the form of compressed graphical command tokens to a sink device, such as sink device 6, over a communication channel, such as communication channel 8. Examples of source device 4 may include, but are not limited to mobile devices such as smartphones or other mobile handsets, tablet computers, laptop computers, desktop computers, wearable computing devices (e.g., smart watches, visors, and the like), one or more processing units or other integrated circuits or chip sets, or other electronic devices. As illustrated in the example of FIG. 3, source device 4 may include communication module 10, graphics processing unit (GPU) 12, streaming module 14, texture elements 16, and application modules 18A-18N.

Source device 4 may include communication module 10 which may manage communications between source device 4 and one or more external devices, such as sink device 6. For instance, communication module 10 may exchange data with sink device 6 over communication channel 8. As one example, communication module 10 may stream compressed graphical command tokens to sink device 6 over communication channel 8. In some examples, communication module 10 may receive information to be transmitted from other components of source device 4. For example, communication module 10 may receive compressed graphical command tokens from streaming module 14.

Source device 4 may include GPU 12 which may render frames of video data based on one or more texture elements and graphical command tokens. Some examples of graphical commands which may be performed by GPU 12 include, but are not limited to, the DirectX® API by Microsoft®, the OpenGL® API by the Khronos group, and the OpenCL™ API. In some examples, GPU 12 may render frames of video data based on graphical command tokens and texture elements associated with one or more of application modules 18. For instance, GPU 12 may render frames of video data based on graphical command tokens and texture elements associated with an application module of application modules 18 for output at a display operatively coupled to or included in source device 4.

Source device 4 may include streaming module 14 which may be configured to stream video data to one or more external devices. For instance, streaming module 14 may stream video data in the form of graphical command tokens and texture elements to sink device 6. In some examples streaming module 14 may encapsulate the graphical command tokens in a command frame, such as command frame 100 of FIG. 1. In some examples, streaming module 14 may capture the graphical command tokens and/or texture elements 16 at an input of GPU 12. In some examples, as opposed to outputting complete graphical command tokens, streaming module 14 may output a compressed version of the graphical command tokens. In some examples, streaming module 14 may generate the compressed version of the graphical command tokens using one or both of predictive frame-based coding and token-based coding.

In some examples, in addition to the compressed version of the graphical command tokens, streaming module 14 may output an indication of a compression status of the graphical command tokens. For instance, streaming module 14 may output a command frame that includes a version of the graphical command tokens and an indication of whether the version of the graphical command tokens is uncompressed, compressed using predictive frame-based coding, or compressed using, token-based coding.

Source device 4 may include application modules 18 which may each represent an application provided by an entity that manufactures source device 4 or software operating on source device 4 or an application developed by a third-party for use with source device 4. Examples of application modules 18 may include applications for gaming, shopping, travel routing, maps, audio and/or video presentation, word processing, spreadsheets, voice and/or calls, weather, etc.

Source device 4 may include texture elements 16 which may be utilized by a GPU to render frames of video data. In some examples, one or more of texture elements 16 may be associated with a particular application module of application modules 18. For instance, where a gaming application of application modules 18 entails the slicing of falling fruit (e.g., watermelons, avocados, pineapples, etc.), example texture elements of texture elements 16 that may be associated with the gaming application include a graphical representation of each of the types of fruit. In some examples, texture elements 16 may be stored in a plurality of formats. Some example formats include, but are not limited to, RGBα 8888, RGBα 4444, RGBα 5551, RGB 565, Yα 88, and α 8.

WD 2 may include sink device 6 which may be configured to receive video data in the form of compressed graphical command tokens from a source device, such as source device 4, over a communication channel, such as communication channel 8. Examples of sink device 6 may include, but are not limited to mobile devices such as smartphones or other mobile handsets, tablet computers, laptop computers, desktop computers, wearable computing devices (e.g., smart watches, visors, and the like), televisions, monitors, one or more processing units or other integrated circuits or chip sets, or other electronic devices. As illustrated in the example of FIG. 3, sink device 6 may include communication module 19, graphics processing unit (GPU) 20, streaming module 22, and texture elements 24.

Sink device 6 may include communication module 19 which may manage communications between sink device 6 and one or more external devices, such as source device 4. In some example, communication module 19 may perform operations similar to communication module 10 of source device 4. For instance, communication module 19 may exchange data with source device 4 over communication channel 8. As one example, communication module 19 may receive graphical command tokens and texture elements from source device 4 over a direct Wi-Fi connection. In some examples, communication module 19 may provide received information to other components of sink device 6. For example, communication module 19 may provide received graphical command tokens and texture elements to streaming module 22.

Sink device 6 may include GPU 20 which may perform operations similar to GPU 12 of source device 4. For instance, GPU 20 may render frames of video data based on one or more texture elements and graphical command tokens. In some examples, GPU 20 may be capable of performing the same graphical commands as GPU 12. Some examples of graphical commands which may be performed by GPU 20 include, but are not limited to, the DirectX® API by Microsoft®, the OpenGL® API by the Khronos group, and the OpenCL™ API. In some examples, GPU 20 may render frames of video data based on graphical command tokens and texture elements received from one or more other components of sink device 6, such as streaming module 22. For instance, GPU 20 may render frames of video data based on graphical command tokens and texture elements associated received from streaming module 22 for output at a display operatively coupled to or included in sink device 6.

Sink device 6 may include streaming module 22 which may be configured to receive streaming video data from one or more external devices. For instance, streaming module 22 may receive streaming video data in the form of graphical command tokens and texture elements from source device 4. In some examples, the graphical command tokens received by streaming module 22 may be encapsulated in a command frame, such as command frame 100 of FIG. 1. In such examples, streaming module 22 may be configured to decapsulate the graphical command tokens. In some examples, as opposed to receiving complete graphical command tokens, streaming module 22 may receive compressed graphical command tokens. In such examples, streaming module 22 may be configured to reconstruct the graphical command tokens based on the received compressed graphical command tokens.

In some examples, in addition to the compressed graphical command tokens, streaming module 22 may receive an indication of a compression status of the compressed graphical command tokens. For instance, streaming module 22 may receive a command frame that includes a version of the graphical command tokens and an indication of whether the received version of the graphical command tokens is uncompressed, compressed using predictive frame-based coding, or compressed using, token-based coding.

Sink device 6 may include texture elements 24 which may be utilized by a GPU to render frames of video data. In some examples, streaming module 22 may store texture elements received from source device 4 in texture elements 24.

A user of source device 4 may desire to stream video from source device 4 to sink device 6. For instance, where a size of a display of source device 4 is smaller than a size of a display of sink device 6, the user of source device 4 may desire to utilize the larger display of sink device 6 to output the video. However, it may not be desirable to transmit constructed frames of video data from source device 4 to sink device 6, e.g., due to bandwidth restrictions, processing power, and the like. In accordance with one or more techniques of this disclosure, streaming module 14 source device 4 may output graphical command tokens and one or more texture elements to streaming module 22 of sink device 6 via communication channel 8 in order to cause GPU 20 of sink device 6 to render frames of video data. In this way, as opposed to streaming video data in the pixel domain, source device 4 may stream video data to sink device 6 in the graphics domain, e.g., by streaming graphical commands and texture elements.

In some examples, the graphical command tokens used to render consecutive frames may be similar. For instance, the graphical command tokens used to render frame n may be similar to the graphical command tokens used to render frame n+1. In accordance with one or more techniques of this disclosure, as opposed to transmitting complete graphical command tokens for each frame, source device 4 may exploit this redundancy to compress the graphical command tokens for one or more frames. For instance, to cause sink device 6 to render a current frame n, source device 4 may transmit a compressed version of the graphical command tokens for the current frame n to sink device 6. In some examples, the compressed version of the graphical command tokens for the current frame n may define a difference between the graphical command tokens for frame n and graphical command tokens for a previous frame n−1. In this way, source device 4 may reduce the data rate required for transmission of the graphical command tokens for the current frame n.

Figure 4:
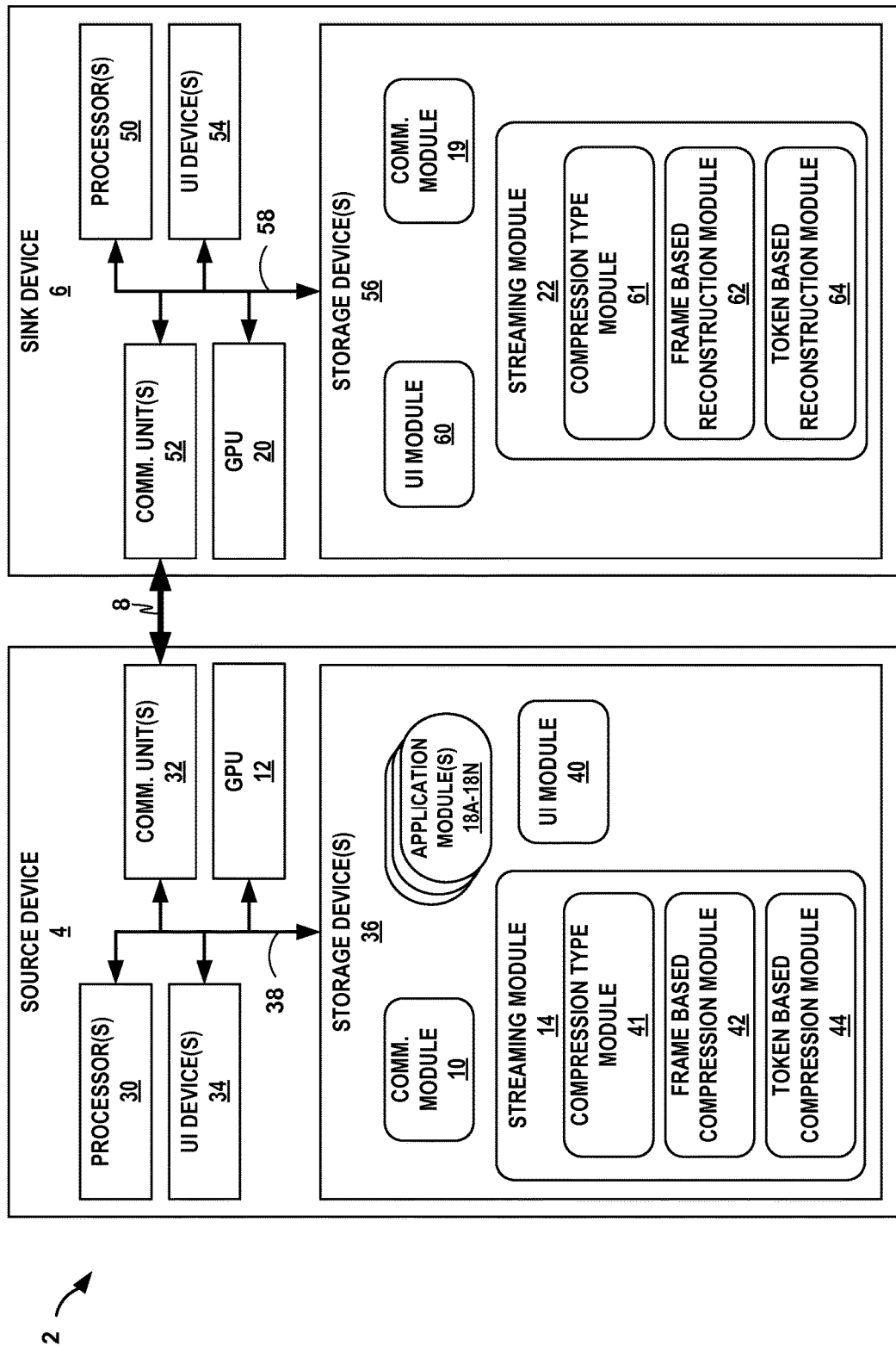
FIG. 4 is a block diagram illustrating further details of one example of source device 4 and sink device 6 of FIG. 3 in which source device 4 is configured to stream video data to sink device 6 over communication channel 8, in accordance with one or more techniques of the present disclosure.

FIG. 4 is a block diagram illustrating further details of one example of source device 4 and sink device 6 of FIG. 3 in which source device 4 is configured to stream video data to sink device 6 over communication channel 8, in accordance with one or more techniques of the present disclosure.

As illustrated in FIG. 4, source device 4 may include one or more processors 30, one or more communication units 32, one or more user interface (UI) devices 34, and one or more storage devices 36. Each of components 30, 32, 34, and 36 may be interconnected (physically, communicatively, and/or operatively) via communication channels 38 for inter-component communications. In some examples, communication channels 38 may include a system bus, network connection, interprocess communication data structure, or any other channel for communicating data. One or more of storage devices 36, in some examples, may include communication module 10, streaming module 14, texture elements 16, one or more application modules 18A-18N (collectively, "application modules 18"), and UI module 40.

Processors 30, in one example, are configured to implement functionality and/or process instructions for execution within source device 4. For example, processors 30 may be capable of processing instructions stored in one or more of storage devices 36. Examples of processors 30 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Source device 4, in some examples, also includes ones or more communication units 32. Source device 4, in one example, utilizes one or more of communication units 32 to communicate with external devices via one or more networks, such as one or more wireless networks. One or more of communication units 32 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, source device 4 utilizes communication unit 32 to wirelessly communicate with an external device. For instance, source device 4 may utilize communication unit 32 to wirelessly communicate with communication unit 52 of sink device 6 over communication channel 8. In some examples, communication unit 32 may receive input from other components of source device 4, such as communication module 10, that causes communication unit 32 to communicate with an external device.

Source device 4, in some examples, may also include one or more UI devices 34. In some examples, one or more of UI devices 34 can be configured to output content, such as video data. For instance, a display of UI devices 34 may be configured to display frames of video data rendered by GPU 12. In addition to outputting content, one or more of UI devices 34 may be configured to receive tactile, audio, or visual input. Some examples of UI devices 34 include video displays, speakers, keyboards, touch screens, mice, cameras, and the like.

Source device 4, in some examples, may also include UI module 40. UI module 40 can perform one or more functions to receive, content, such as UI data from other components associated with source device 4 and cause one or more of UI devices 34 to output the content. In some examples, UI module 40 may be configured to receive an indication of input, such as user input, and send the indications of the input to other components associated with source device 4, such as streaming module 14.

One or more storage devices 36 may be configured to store information within source device 4 during operation. One or more of storage devices 36, in some examples, may comprise a computer-readable storage medium. In some examples, one or more of storage devices 36 may comprise a temporary memory, meaning that a primary purpose of one or more of storage devices 36 is not long-term storage. One or more of storage devices 36, in some examples, may comprise a volatile memory, meaning that one or more of storage devices 36 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 36 is used to store program instructions for execution by processors 30. One or more of storage devices 36, in one example, may be used by software or modules running on source device 4 (e.g., communication module 10, streaming module 14, application modules 18, and UI module 40) to temporarily store information during program execution.

One or more of storage devices 36, in some examples, may also include one or more computer-readable storage media. One or more of storage devices 36 may further be configured for long-term storage of information. In some examples, one or more of storage devices 36 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As discussed above, source device 4 may include streaming module 14, which may be configured to stream video data to one or more external devices. In some examples, streaming module 14 may include compression type module 41, frame based compression module 42, and token based compression module 44.

Compression type module 41, in some examples, may be configured to determine whether to output a set of graphical command tokens with compression or without compression. In some examples, where compression type module 41 determines to output the set of graphical command tokens with compression, compression type module 41 may be further configured to determine whether to compress the set of graphical command tokens using frame based compression or token based compression. In some examples, compression type module 41 may invoke frame based compression module 42 to compress the set of graphical command tokens using frame based compression. In some examples, compression type module 41 may invoke token based compression module 44 to compress the set of graphical command tokens using token based compression. In some examples, compression type module 41 may determine whether to output a set of graphical command tokens with compression or without compression in accordance with the techniques of FIG. 6A or FIG. 6B.

Frame based compression module 42, in some examples, may be configured to compress a set of graphical command tokens on a frame level. In accordance with one or more techniques of this disclosure, frame based compression module 42 may compress a current set of graphical command tokens on a frame level by outputting information corresponding to a delta between the current set of graphical command tokens and a previous set of graphical command tokens. For instance, frame based compression module 42 may determine a list that indicates respective locations of one or more chunks of data within a set tokens for a current frame that are different than chunks of data within a set tokens for a previous frame, and outputting the list and the one or more chunks of data within the set tokens for the current frame that are different than chunks of data within the set tokens for the previous frame. In some examples, frame based compression module 42 may compress a set of graphical command tokens on a frame level in accordance with the techniques of FIG. 7.

Token based compression module 44, in some examples, may be configured to compress a set of graphical command tokens on a token level. Token based compression module 44 may be configured to determine the similarity between two set of graphical command tokens. For instance, token based compression module 44 may perform a token search to determine whether tokens of a current frame are similar to tokens of a previous frame. To perform the token search, token based compression module 44 may, for each token of a current frame, search a previous frame to determine whether the previous frame includes a similar token. In some examples, token based compression module 44 may determine that a token of the current frame is similar to a token of the previous frame where the token of the current frame is of the same token type and has the same token data size as the token of the previous frame. As discussed above with reference to FIG. 1, the type of a token (e.g., token type 126) may indicate which graphical command of a set of graphical commands the token corresponds to, and the data size of a token (e.g., token data size 130) may indicate a size of one or more arguments associated with the token.

In some examples, token based compression module 44 may generate a token prediction map that indicates the results of the token search. For instance, the token prediction map may indicate, for each token of the current frame, whether a similar token can be located in the previous frame. As one example, if a similar token cannot be located for a particular token of the current frame, the token prediction map may include a zero for the particular token. As another example, if a similar token can be located for a particular token of the current frame, the token prediction map may identify which token of the previous frame is similar to the particular token of the current frame.

Figure 5A:
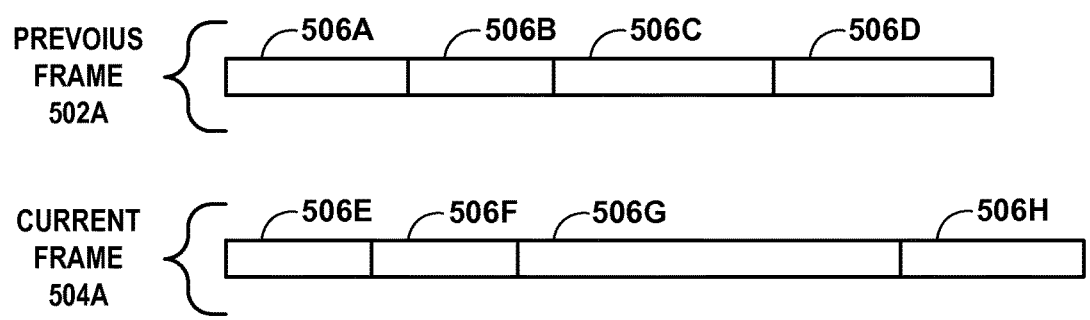
Figure 5B:
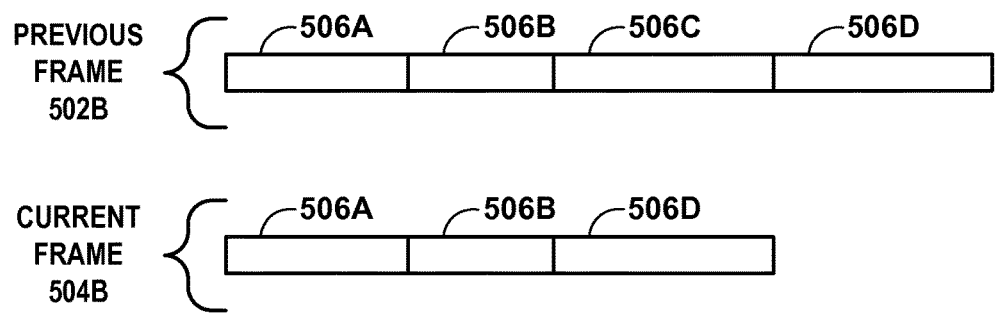

FIGS. 5A-5C are conceptual diagrams illustrating example sets of tokens which may be analyzed by a source device to perform token based compression, in accordance with one or more techniques of this disclosure. Each of FIGS. 5A-5C illustrates a respective previous frame of previous frames 502A-502C (collectively, "previous frames 502") and a respective current frame of current frames 504A-504C (collectively, "current frames 504"). Each of previous frames 502 and current frames 504 includes some combination of tokens 506A-506I.

As discussed above, token based compression module 44 may perform a token search to determine whether tokens of a current frame are similar to tokens of a previous frame. In some examples, the tokens of a current frame may be totally different than the tokens of a previous frame and token based compression module 44 may be unable to find a similar token in the previous frame for any tokens of the current frame. For instance, as illustrated in the example of FIG. 5A, token based compression module 44 may determine that the tokens of current frame 504A are completely different than the tokens of previous frame 502A because tokens 506A-506D are completely different than tokens 506E-506H.

In some examples, at least one tokens of the current frame may be similar to a token of the previous frame. As one example, the previous frame may include one or more tokens that are not similar to tokens included in the current frame. For instance, as illustrated in the example of FIG. 5B, token based compression module 44 may determine that previous frame 502B includes a token not included in current frame 504B because token 506C is not included in current frame 504B. As another example, the current frame may include one or more tokens that are not similar to tokens included in the previous frame. For instance, as illustrated in the example of FIG. 5C, token based compression module 44 may determine that current frame 504C includes a token not included in previous frame 502C because tokens 506H and 506I are not similar to tokens included in previous frame 502C.

As discussed above, token based compression module 44 may generate a token prediction map that indicates the results of the token search. In the example of FIG. 5A, where none of the tokens of previous frame 502A (i.e., 506A-506D) are similar to the tokens of current frame 504A (i.e., 506E-506H), token based compression module 44 may generate a token prediction map that indicates that all of the tokens in current frame 504A are new tokens [0, 0, 0, 0].

In the example of FIG. 5B, where a similar token can be found in previous frame 502B (i.e., 506A, 506B, and 506D) for each token of current frame 504B (i.e., 506A, 506B, and 506D), token based compression module 44 may generate a token prediction map of [1, 2, 4] to indicate that the similar token for the first token of current frame 504B is the first token of previous frame 502B, the similar token for the second token of current frame 504B is the second token of previous frame 502B, and similar token for the third token of current frame 504B is the fourth token of previous frame 502B.

In the example of FIG. 5C, where a similar token can be found in previous frame 502B (i.e., 506A, 506B, 506C, and 506D) for some tokens of current frame 504C (i.e., 506A, 506B, 506C, and 506D), token based compression module 44 may generate a token prediction map of [1, 2, 0, 0, 3, 4] to indicate that the similar token for the first token of current frame 504C is the first token of previous frame 502C, the similar token for the second token of current frame 504C is the second token of previous frame 502C, the third and fourths tokens of current frame 504C are new tokens, the similar token for the fifth token of current frame 504C is the third token of previous frame 502C, and the similar token for the sixth token of current frame 504C is the fourth token of previous frame 502C.

In any case, based on the token prediction map, token based compression module 44 may determine whether the set of tokens for the current frame is sufficiently similar to the set of tokens for the previous frame. In some examples, token based compression module 44 may determine a percentage of tokens of the set of tokens for the current frame for which a similar token can be located in the set of tokens for the previous frame. For instance, token based compression module 44 may determine a percentage of non-zero values included in the token prediction map.

In some examples, responsive to determining that the percentage satisfies a threshold percentage (e.g., 10%, 20%, 30%), token based compression module 44 may determine that the set of tokens for the current frame is sufficiently similar to the set of tokens for the previous frame. In some examples, responsive to determining that the percentage does not satisfy the threshold percentage, token based compression module 44 may determine that the set of graphical command tokens for the current frame is not sufficiently similar to the set of graphical command tokens for the previous frame. In some examples, the percentage may satisfy the threshold percentage where the percentage is greater than the threshold percentage.

Where the set of tokens for the current frame is not sufficiently similar to the set of tokens for the previous frame, token based compression module 44 may output an uncompressed version of the current set of graphical command tokens. Where the set of tokens for the current frame is sufficiently similar to the set of tokens for the previous frame, token based compression module 44 may output the token prediction map and a representation of each token. As one example, for each respective token of the current set of graphical command tokens for which a similar graphical command token cannot be located in the previous set of graphical command tokens, token based compression module 44 may output the respective graphical command token. For instance, in the example of FIG. 5C, token based compression module 44 may output tokens 506H and 506I of current frame 504C.

As another example, for each respective graphical command token of the current set of graphical command tokens for which a similar graphical command token can be located in the previous set of graphical command tokens, token based compression module 44 may output a list indicating respective locations of one or more chunks of data within the respective graphical command token that are different than chunks of data within the located similar graphical command token of the previous set of graphical command tokens, and the one or more chunks of data within the respective token that are different than the chunks of data within the similar graphical command token. For instance, in the example of FIG. 5C, token based compression module 44 may output, for token 506A of current frame 504C, a list indicating respective locations of one or more chunks of data within token 506A of current frame 504C that are different than chunks of data within token 506A of previous frame 502C, and the one or more chunks of data within token 506A of current frame 504C that are different than the chunks of data within token 506A of previous frame 502C. Token based compression module 44 may determine and output a similar list and chunks for tokens 506B and 506D of current frame 504C.

Referring back to FIG. 4, sink device 6 may include one or more processors 50, one or more communication units 52, one or more user interface (UI) devices 54, and one or more storage devices 56. Each of components 50, 52, 54, and 56 may be interconnected (physically, communicatively, and/or operatively) via communication channels 58 for inter-component communications. In some examples, communication channels 58 may include a system bus, network connection, interprocess communication data structure, or any other channel for communicating data. One or more of storage devices 56, in some examples, may include communication module 19, streaming module 22, texture elements 24, and UI module 60.

Processors 50, in some examples, may be configured to implement functionality and/or process instructions for execution within sink device 6. For example, processors 50 may be capable of processing instructions stored in one or more of storage devices 56. Examples of processors 50 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Sink device 6, in some examples, also includes ones or more communication units 52. Sink device 6, in one example, utilizes one or more of communication units 52 to communicate with external devices via one or more networks, such as one or more wireless networks. One or more of communication units 52 may be a network interface card, such as a USB transceiver, an Ethernet card, an optical transceiver, a radio frequency transceiver, or any other type of device that can send and receive information. Other examples of such network interfaces may include Bluetooth, 3G, and Wi-Fi radios. In some examples, sink device 6 utilizes communication unit 52 to wirelessly communicate with an external device. For instance, sink device 6 may utilize communication unit 52 to wirelessly communicate with communication unit 32 of source device 4 over communication channel 8. In some examples, communication unit 52 may provide received data to other components of sink device 6, such as communication module 19.

Sink device 6, in some examples, may also include one or more UI devices 54. In some examples, one or more of UI devices 54 can be configured to output content, such as video data. For instance, a display of UI devices 54 may be configured to display frames of video data rendered by GPU 20. In addition to outputting content, one or more of UI devices 54 may be configured to receive tactile, audio, or visual input. Some examples of UI devices 54 include video displays, speakers, keyboards, touch screens, mice, cameras, and the like.

Sink device 6, in some examples, may also include UI module 60. UI module 60 can perform one or more functions to receive, content, such as UI data from other components associated with sink device 6 and cause one or more of UI devices 54 to output the content. In some examples, UI module 60 may be configured to receive an indication of input, such as user input, and send the indications of the input to other components associated with sink device 6, such as streaming module 14.

One or more storage devices 56 may be configured to store information within sink device 6 during operation. One or more of storage devices 56, in some examples, may comprise a computer-readable storage medium. In some examples, one or more of storage devices 56 may comprise a temporary memory, meaning that a primary purpose of one or more of storage devices 56 is not long-term storage. One or more of storage devices 56, in some examples, may comprise a volatile memory, meaning that one or more of storage devices 56 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 56 is used to store program instructions for execution by processors 50. One or more of storage devices 56, in one example, may be used by software or modules running on sink device 6 (e.g., communication module 19, streaming module 22, and UI module 60) to temporarily store information during program execution.

One or more of storage devices 56, in some examples, may also include one or more computer-readable storage media. One or more of storage devices 56 may further be configured for long-term storage of information. In some examples, one or more of storage devices 56 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As discussed above, sink device 6 may include streaming module 22, which may be configured to receive streaming video data from one or more external devices. In some examples, streaming module 22 may include compression type module 61, frame based reconstruction module 42, and token based reconstruction module 64.

Compression type module 61, in some examples, may be configured to determine whether or not a current set of graphical command tokens is compressed. In some examples, such as where the current set of graphical command tokens is compressed using frame based compression, compression type module 61 may invoke frame based reconstruction module 62 to reconstruct the current set of graphical command tokens. In some examples, such as where the current set of graphical command tokens is compressed using token based compression, compression type module 61 may invoke token based reconstruction module 64 to reconstruct the current set of graphical command tokens.

Frame based reconstruction module 62, in some examples, may be configured to reconstruct a set of graphical command tokens on a frame level. In accordance with one or more techniques of this disclosure, frame based reconstruction module 62 may reconstruct a current set of graphical command tokens on a frame level based on information corresponding to a delta between the current set of graphical command tokens and a previous set of graphical command tokens. For instance, based on a list that indicates respective locations of one or more chunks of data within a current set of tokens that are different than chunks of data within a previous set of tokens, and the one or more chunks of data, frame based reconstruction module 62 may reconstruct the current set of graphical command tokens on a frame level by replacing data at the respective locations of the previous set of graphical command tokens with the one or more received chunks of data.

FIGS. 6A and 6B are conceptual diagrams illustrating example command frames which may be output by a source device to stream video frames to a sink device, in accordance with one or more techniques of this disclosure. As illustrated in FIG. 6A, command frame 602 includes prediction flag 606, frame size field 608, and frame copy field 610. As illustrated in FIG. 6B, command frame 604 includes prediction flag 606, list size field 612, new data size field 614, list field 616, and new data field 618.

Figure 7A:
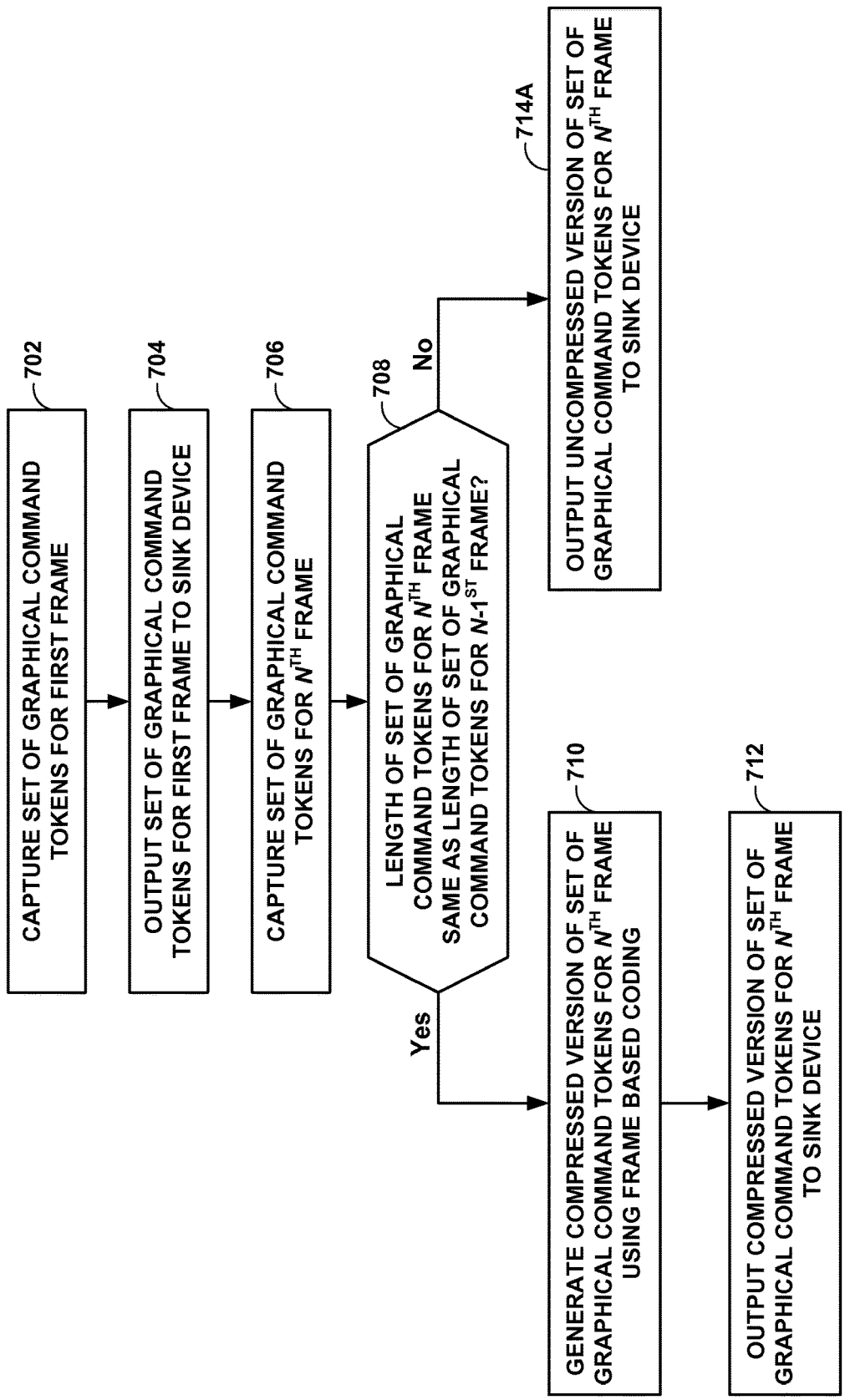
FIGS. 7A and 7B are flow diagrams illustrating example operations of a source device to stream video data to a sink device, in accordance with one or more techniques of the present disclosure.
Figure 7B:
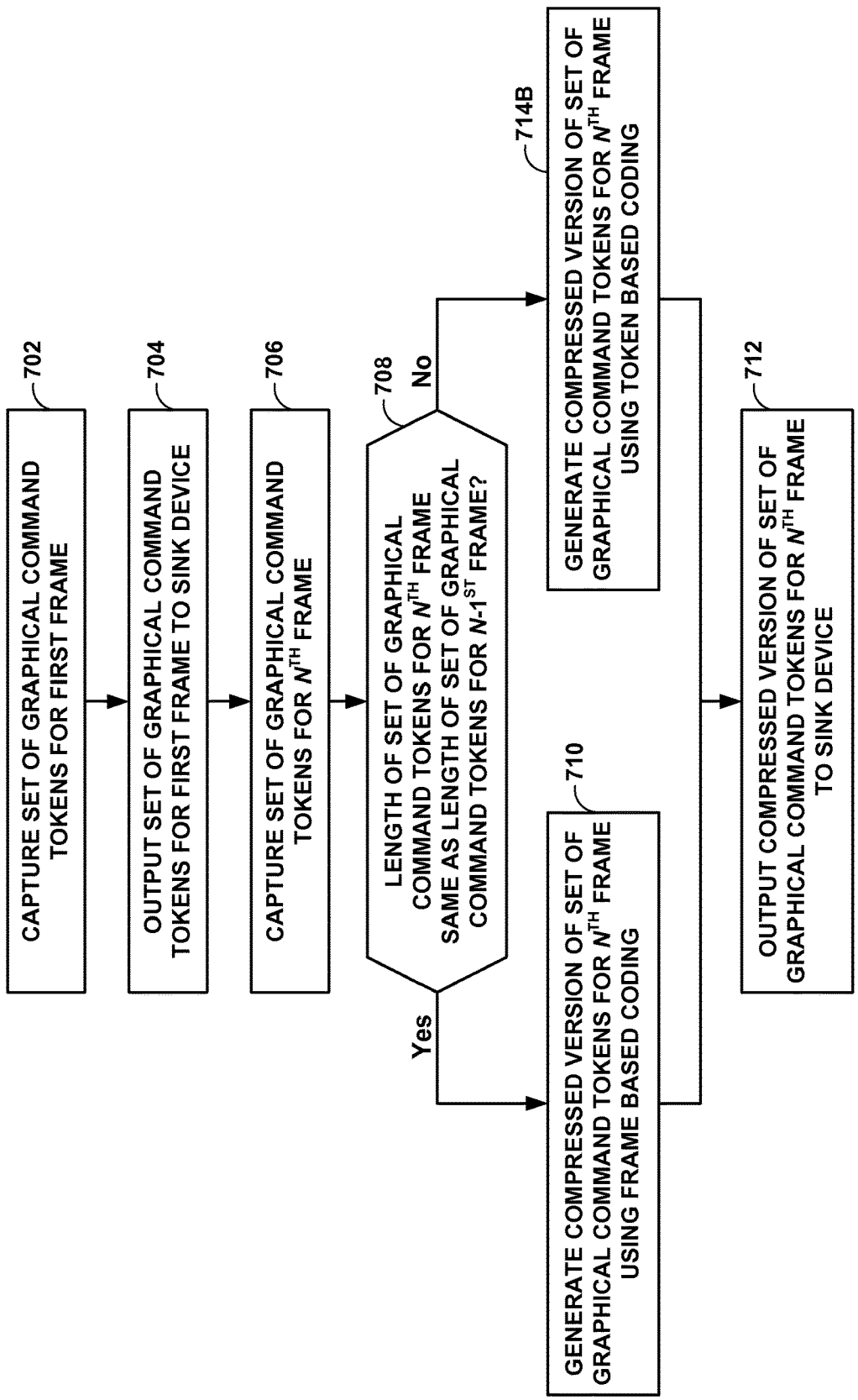

FIGS. 7A and 7B are flow diagrams illustrating example operations of a source device to stream video data to a sink device, in accordance with one or more techniques of the present disclosure. The techniques of FIGS. 7A and 7B may be performed by one or more processors of a computing device, such as source device 4 illustrated in FIGS. 3 and 4. For purposes of illustration, the techniques of FIGS. 7A and 7B are described within the context of source device 4 illustrated in FIGS. 3 and 4, although computing devices having configurations different than that of source device 4 may perform the techniques of FIGS. 7A and 7B.

In accordance with one or more techniques of this disclosure, streaming module 14 of source device 4 may capture a set of graphical command tokens for a first frame (702). For example, streaming module 14 may capture the set of graphical command tokens for a first frame at an input of a GPU included in source device 4.

Streaming module 14 may output the set of graphical command tokens for the first frame to sink device 6 (704). For example, streaming module 14 may transmit the set of graphical command tokens for the first frame via a wireless communication link between source device 4 and sink device 6. In some examples, in addition to the set of graphical command tokens for the first frame, streaming module 14 may also output one or more texture elements to sink device 6.

In some examples, streaming module 14 may output the set of graphical command tokens for the first frame without compression. For instance, streaming module 14 may generate a command frame, such as command frame 100 of FIG. 1, that includes the set of command tokens for the first frame (i.e., the set of command tokens for the first frame may be tokens 114 of FIG. 1).

As discussed above and in accordance with one or more techniques of this disclosure, streaming module 14 may output sets of graphical command tokens for subsequent frames with compression. For instance, streaming module 14 may capture a set of graphical command tokens for an $n^{th}$ frame (706). Similarly to the first frame, streaming module 14 may capture the set of graphical command tokens for the $n^{th}$ frame at the input of the GPU included in source device 4.

Compression type module 41 may determine whether to output the set of graphical command tokens for the $n^{th}$ frame with compression or without compression. For instance, compression type module 41 may determine whether a length of the set of graphical command tokens for the $n^{th}$ frame is the same as a length of a set of graphical command tokens for an $n-1^{st}$ frame (708).

Responsive to determining that the length of the set of graphical command tokens for the $n^{th}$ frame is the same as the length of the set of graphical command tokens for the $n-1^{st}$ frame ("Yes" branch of 708), compression type module 41 may invoke frame based compression module 42 to generate a compressed version of the set of graphical command tokens for the $n^{th}$ frame using frame based coding (710), and output the compressed version of the set of graphical command tokens for the $n^{th}$ frame to sink device 6 (712). In some examples, frame based compression module 42 may perform frame based compression in accordance with the techniques of FIG. 7.

In some examples, such as the example of FIG. 6A, responsive to determining that the length of the set of graphical command tokens for the $n^{th}$ frame is different than the length of the set of graphical command tokens for the $n-1^{st}$ frame ("No" branch of 708), streaming module 14 may output an uncompressed version of the set of graphical command tokens for the $n^{th}$ frame to sink device 6 (714A). In some examples, streaming module 14 may encapsulate the uncompressed version of the set of graphical command tokens for the $n^{th}$ frame in a command frame. For instance, streaming module 14 may generate a first command frame, such as command frame 100 of FIG. 1, where frame data field 104 includes the set of graphical command tokens for the $n^{th}$ frame (i.e., tokens 114 include the set of graphical command tokens for the $n^{th}$ frame). In some examples, streaming module 14 may further encapsulate the first command frame in a second command frame, such as command frame 602 of FIG. 6A, where prediction flag 606 indicates that the set of graphical command tokens for the $n^{th}$ frame are uncompressed, frame size field 608 indicates a size of the second command frame, and frame copy field 610 is the first command frame.

In some examples, such as the example of FIG. 7B, responsive to determining that the length of the set of graphical command tokens for the $n^{th}$ frame is different than the length of the set of graphical command tokens for the $n-1^{st}$ frame ("No" branch of 708), frame based compression module 42 may invoke token based compression module 44 to generate a compressed version of the set of graphical command tokens for the $n^{th}$ frame using token based coding (714B), and output the compressed version of the set of graphical command tokens for the $n^{th}$ frame to sink device 6 (712). In some examples, token based compression module 44 may perform token based compression in accordance with the techniques of FIG. 9.

Figure 8:
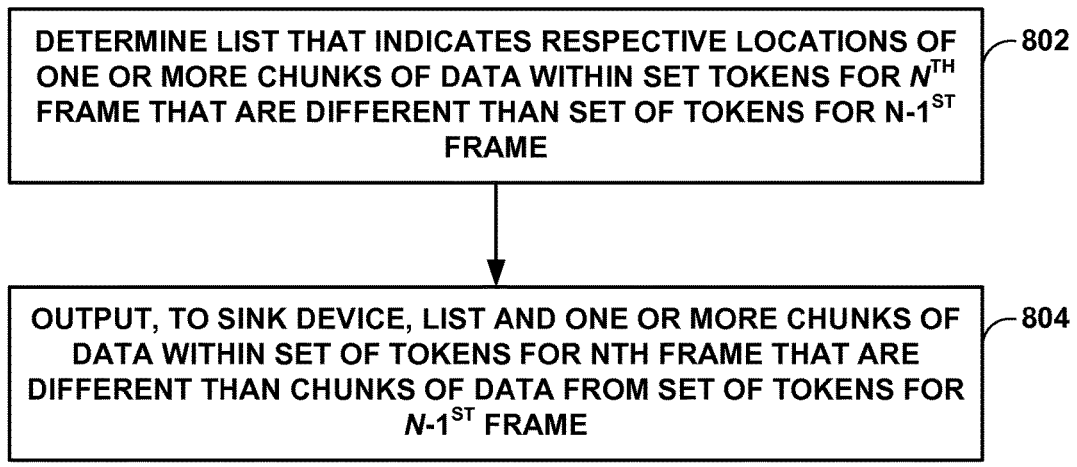
FIG. 8 is a flow diagram illustrating example operations of a source device to stream video data to a sink device using frame based compression, in accordance with one or more techniques of the present disclosure.

FIG. 8 is a flow diagram illustrating example operations of a source device to stream video data to a sink device using frame based compression, in accordance with one or more techniques of the present disclosure. The techniques of FIG. 8 may be performed by one or more processors of a computing device, such as source device 4 illustrated in FIGS. 3 and 4. For purposes of illustration, the techniques of FIG. 8 are described within the context of source device 4 illustrated in FIGS. 3 and 4, although computing devices having configurations different than that of source device 4 may perform the techniques of FIG. 8.

As discussed above, in some examples, frame based compression module 42 may perform frame based compression in accordance with the techniques of FIG. 8. For instance, frame based compression module 42 may determine a list that indicates respective locations of one or more chunks of data within a set of graphical command tokens for an $n^{th}$ frame that are different than a set of graphical command tokens for an $n-1^{st}$ frame (802). In some examples, the chunks of data may be bytes of data. As one example, if the bytes at locations 70, 71, 72, 80, 113, 114, 158, 159, 160, 161, and 188 within the set of graphical command tokens for the $n^{th}$ frame are different bytes of data at locations 70, 71, 72, 80, 113, 114, 158, 159, 160, 161, and 188 of the set of graphical command tokens for the $n-1^{st}$ frame, frame based compression module 42 may generate a list that indicates locations 70, 71, 72, 80, 113, 114, 158, 159, 160, 161, and 188. In some examples, frame based compression module 42 may generate the list by differentially encoding the locations. For instance, frame based compression module 42 may differentially encode locations 70, 71, 72, 80, 113, 114, 158, 159, 160, 161, and 188 as 70, 1, 1, 8, 33, 1, 44, 1, 1, 1, and 27. In some examples, frame based compression module 42 may encode the differential locations using exponential Golomb coding. For instance, frame based compression module 42 may encode the above differential locations using exponential Golomb coding as "0000001000110", "1", "1", "0001000", "00000100001", "1", etc. . . . . In this way, frame based compression module 42 may reduce the amount of data required to represent the list of locations.

In any case, frame based compression module 42 may output a compressed version of the set of graphical command tokens for the $n^{th}$ frame by outputting the list and the one or more chunks of data within the set of graphical command tokens for the $n^{th}$ frame that are different than chunks of data within the set of graphical command tokens for the $n-1^{st}$ frame (804). In some examples, frame based compression module 42 may encapsulate the compressed version of the set of graphical command tokens for the $n^{th}$ frame in a command frame, such as command frame 604 of FIG. 6B. For instance, frame based compression module 42 may generate command frame 604 with prediction flag 606 indicating that the set of graphical command tokens for the $n^{th}$ frame is compressed using frame based compression, list size field 612 indicating a size of the list of locations, new data size 614 indicating a size of the one or more chunks of data within the set of graphical command tokens for the $n^{th}$ frame that are different than chunks of data within the set of graphical command tokens for the $n-1^{st}$ frame, list 616 including an encoded version of the list of locations, and new data field 618 including the one or more chunks of data within the set of graphical command tokens for the $n^{th}$ frame that are different than chunks of data within the set of graphical command tokens for the $n-1^{st}$ frame. In this way, frame based compression module 42 may compress graphical command tokens using frame based compression.

Figure 9:
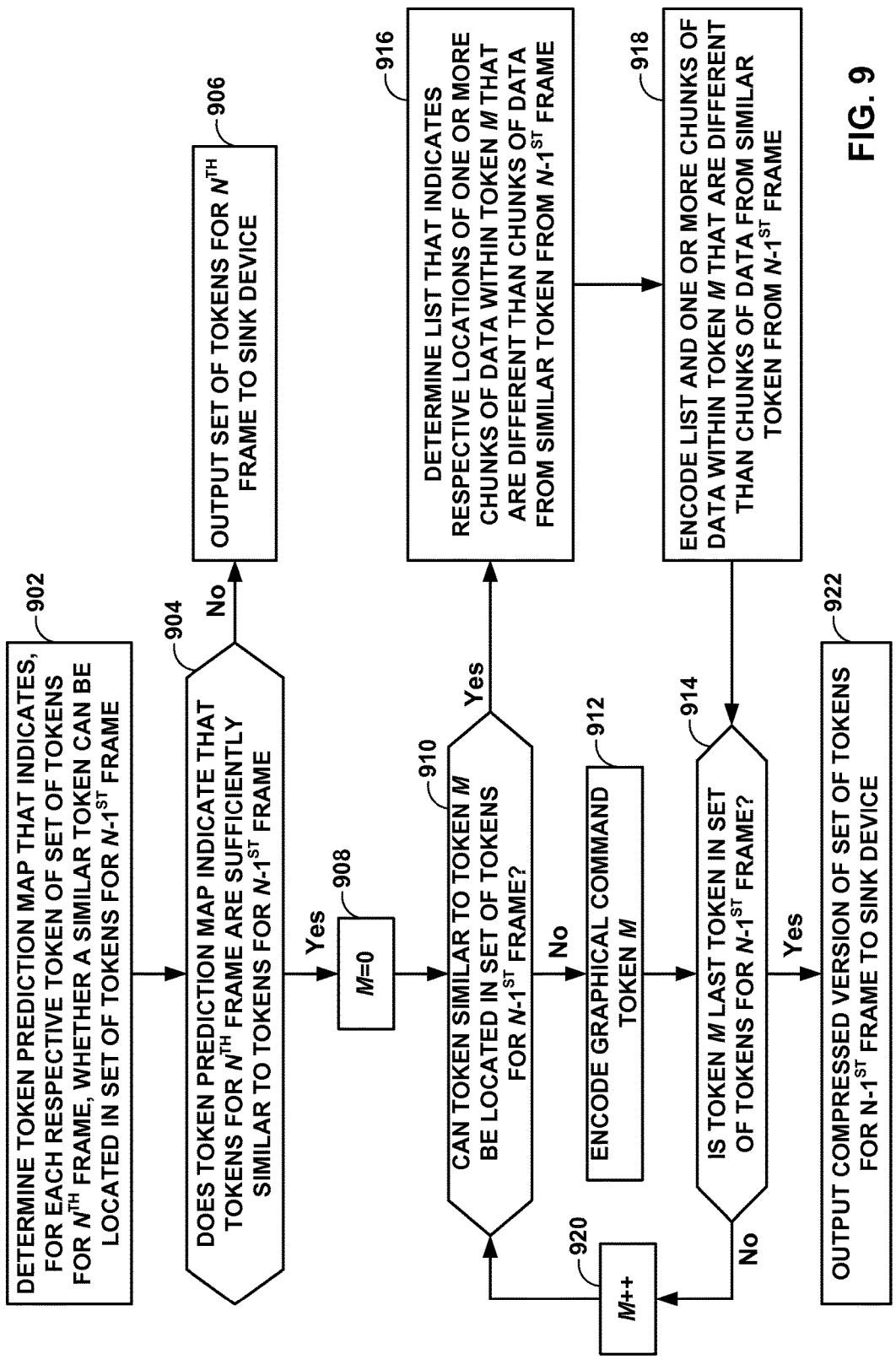
FIG. 9 is a flow diagram illustrating example operations of a source device to stream video data to a sink device using token based compression, in accordance with one or more techniques of the present disclosure.

FIG. 9 is a flow diagram illustrating example operations of a source device to stream video data to a sink device using token based compression, in accordance with one or more techniques of the present disclosure. The techniques of FIG. 9 may be performed by one or more processors of a computing device, such as source device 4 illustrated in FIGS. 3 and 4. For purposes of illustration, the techniques of FIG. 9 are described within the context of source device 4 illustrated in FIGS. 3 and 4, although computing devices having configurations different than that of source device 4 may perform the techniques of FIG. 9.

As discussed above, in some examples, token based compression module 44 may perform token based compression in accordance with the techniques of FIG. 9. For instance, token based compression module 44 may determine a token prediction map that indicates, for each graphical command token M of a set of graphical command tokens for an $n^{th}$ frame, whether a similar graphical command token can be located in the a set of graphical command tokens for an $n-1^{st}$ frame (902). In some examples, token based compression module 44 may determine, for a particular graphical command token of the set of graphical command tokens for the $n^{th}$ frame, that that a similar graphical command token can be located in the set of graphical command tokens for the $n-1^{st}$ frame where a particular graphical command token of the set of graphical command tokens for the $n-1^{st}$ frame has a same token type (e.g., token type 126 of FIG. 1) as the particular graphical command token of the set of graphical command tokens for the $n^{th}$ frame, and a same token data size (e.g., token data size 130 of FIG. 1) as the particular graphical command token of the set of graphical command tokens for the $n^{th}$ frame. In some examples, as opposed to searching the complete set of graphical command tokens for the $n-1^{st}$ frame, token based compression module 44 may search a subset of searching the set of graphical command tokens for the $n-1^{st}$ frame (i.e., a search range). In some examples, the search range may include a quantity of tokens (e.g., 10, 20, 30, 100, . . . , etc.).

Token based compression module 44 may determine whether the token prediction map indicates that the set of graphical command tokens for the $n^{th}$ frame is sufficiently similar to the set of graphical command tokens for the $n-1^{st}$ frame (904). For instance, token based compression module 44 may determine a percentage of graphical command tokens of the set of graphical command tokens for the $n^{th}$ frame for which a similar graphical command token can be located in the set of graphical command tokens for the $n-1^{st}$ frame. In some examples, responsive to determining that the percentage satisfies a threshold percentage (e.g., 10%, 20%, 30%), token based compression module 44 may determine that the set of graphical command tokens for the $n^{th}$ frame is sufficiently similar to the set of graphical command tokens for the $n-1^{st}$ frame. In some examples, responsive to determining that the percentage does not satisfy the threshold percentage, token based compression module 44 may determine that the set of graphical command tokens for the $n^{th}$ frame is not sufficiently similar to the set of graphical command tokens for the $n-1^{st}$ frame. In some examples, the percentage may satisfy the threshold percentage where the percentage is greater than the threshold percentage.

Responsive to determining that the token prediction map does not indicate that the set of graphical command tokens for the $n^{th}$ frame is sufficiently similar to the set of graphical command tokens for the $n-1^{st}$ frame ("No" branch of 904), token based compression module 44 may output an uncompressed version of the set of graphical command tokens for the $n^{th}$ frame to sink device 6. For instance, token based compression module 44 may output the uncompressed version of the set of graphical command tokens for the $n^{th}$ frame similar to operation 714A of FIG. 7A.

Responsive to determining that the token prediction map indicates that the set of graphical command tokens for the $n^{th}$ frame is sufficiently similar to the set of graphical command tokens for the $n-1^{st}$ frame ("Yes" branch of 904), token based compression module 44 may encode the set of graphical command tokens for the $n^{th}$ frame using token based compression. Token based compression module 44 may process a first graphical command token m by setting index value m to zero (908). For instance, for each graphical command token m of the set of graphical command tokens for the $n^{th}$ frame, token based compression module 44 may determine whether a graphical command token similar to graphical command token m can be located in the set of graphical command tokens for the $n-1^{st}$ frame (910).

If a graphical command token similar to graphical command token m cannot be located in the set of graphical command tokens for the $n-1^{st}$ frame ("No" branch of 910), token based compression module 44 may encode, in the compressed version of the set of graphical command tokens for the $n^{th}$ frame, graphical command token m (912), and determine whether graphical command token m is the last token in the set of graphical command tokens for the $n^{th}$ frame (914).

If a graphical command token similar to graphical command token m can be located in the set of graphical command tokens for the $n-1^{st}$ frame ("Yes" branch of 910), token based compression module 44 may encode a delta between graphical command token m and the similar graphical command token in the set of graphical command tokens for the $n-1^{st}$ frame, and determine whether graphical command token m is the last token in the set of graphical command tokens for the $n^{th}$ frame (914). In some examples, token based compression module 44 may encode the delta using techniques similar to the frame based compression techniques of FIG. 8. For instance, token based compression module 44 may determine a list that indicates respective locations of one or more chunks of data within graphical command token m that are different than chunks of data located within the similar graphical command token in the set of graphical command tokens for the $n-1^{st}$ frame (916), and encode, in the compressed version of the set of graphical command tokens for the $n^{th}$ frame, the list and the one or more chunks of data within graphical command token m that are different than the chunks of data located within the similar graphical command token in the set of graphical command tokens for the $n-1^{st}$ frame (918).

In any case, if graphical command token m is not the last token in the set of graphical command tokens for the $n^{th}$ frame ("No" branch of 914), token based compression module 44 may advance to a next graphical command token in the set of graphical command tokens for the $n^{th}$ frame (920) and determine whether a graphical command token similar to graphical command token m+1 can be located in the set of graphical command tokens for the $n-1^{st}$ frame (910). If graphical command token m is the last token in the set of graphical command tokens for the $n^{th}$ frame ("Yes" branch of 914), token based compression module 44 may output the compressed version of the set of graphical command tokens for the $n^{th}$ frame to sink device 6 (922). In this way, token based compression module 44 may compress graphical command tokens using token based compression.

Figure 10:
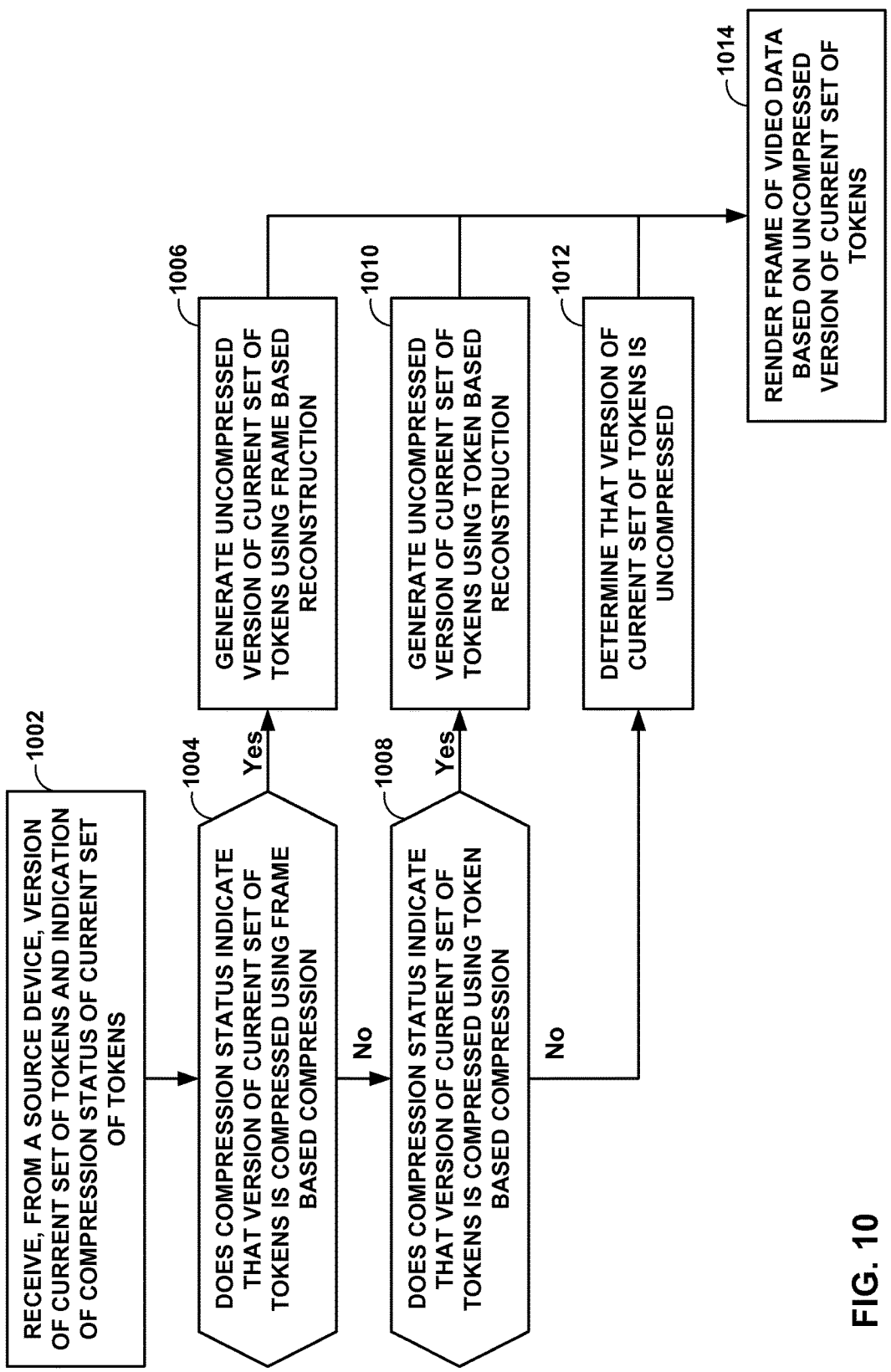
FIG. 10 is a flow diagram illustrating example operations of a sink device to receive streaming video data from a source device, in accordance with one or more techniques of the present disclosure.

FIG. 10 is a flow diagram illustrating example operations of a sink device to receive streaming video data from a source device, in accordance with one or more techniques of the present disclosure. The techniques of FIG. 10 may be performed by one or more processors of a computing device, such as sink device 6 illustrated in FIGS. 3 and 4. For purposes of illustration, the techniques of FIG. 10 are described within the context of sink device 6 illustrated in FIGS. 3 and 4, although computing devices having configurations different than that of sink device 6 may perform the techniques of FIG. 10.

In accordance with one or more techniques of this disclosure, streaming module 22 of sink device 6 may receive, from a source device, a version of a current set of graphical command tokens and an indication of a compression status of the current set of graphical command tokens (1002). In some examples, the current set of graphical command tokens may be from a plurality of sets of graphical command tokens that may be respectively renderable into a plurality of frames of video data. In some examples, the received version of the current set of graphical command tokens may be encapsulated in a command frame, such as command frame 100 of FIG. 1, command frame 602 of FIG. 6A, or command frame 604 of FIG. 6B. In some examples, the indication of the compression status may be a prediction flag, such as prediction flag 606 of FIGS. 6A and 6B.

Compression type module 61 of streaming module 22 may determine whether the compression status indicates that the received version of the current set of graphical command tokens is compressed using frame based compression (1004), using token based compression (1008), or is uncompressed (1012). As one example, if a prediction flag received with the received version of the current set of graphical command tokens has a value that indicates frame based compression (i.e., equals 255), compression type module 61 may determine that the received version of the current set of graphical command tokens is compressed using frame based compression. As another example, if a prediction flag received with the received version of the current set of graphical command tokens has a value that indicates token based compression (i.e., equals a value different than 255), compression type module 61 may determine that the received version of the current set of graphical command tokens is compressed using token based compression. As another example, if a prediction flag is not received with the received version of the current set of graphical command tokens, compression type module 61 may determine that the received version of the current set of graphical command tokens is uncompressed. As another example, if a prediction flag received with the received version of the current set of graphical command tokens equals 0, compression type module 61 may determine that the received version of the current set of graphical command tokens is uncompressed.

If the received version of the current set of graphical command tokens is compressed using frame based compression ("Yes" branch of 1004), streaming module 22 may generate an uncompressed version of the current set of graphical command tokens using frame based reconstruction (1006). For instance, compression type module 61 may invoke frame based reconstruction module 62 to generate the uncompressed version of the current set of graphical command tokens based on a previous set of graphical command tokens using frame based reconstruction in accordance with the techniques of FIG. 11.

If the received version of the current set of graphical command tokens is compressed using token based compression ("Yes" branch of 1008), streaming module 22 may generate an uncompressed version of the current set of graphical command tokens using token based reconstruction (1010). For instance, compression type module 61 may invoke token based reconstruction module 64 to generate the uncompressed version of the current set of graphical command tokens based on a previous set of graphical command tokens using token based reconstruction in accordance with the techniques of FIG. 12.

If the received version of the current set of graphical command tokens is uncompressed ("No" branch of 1008), following frame based reconstruction, or token based reconstruction, streaming module 22 may render a frame of video data based on the uncompressed version of the current set of graphical command tokens (1014). For instance, streaming module 22 may cause GPU 20 of sink device 6 to render the frame of video data based on the uncompressed version of the current set of graphical command tokens. In some examples, GPU 20 may render the frame of video data for output at a display of UI devices 54 of sink device 6.

Figure 11:
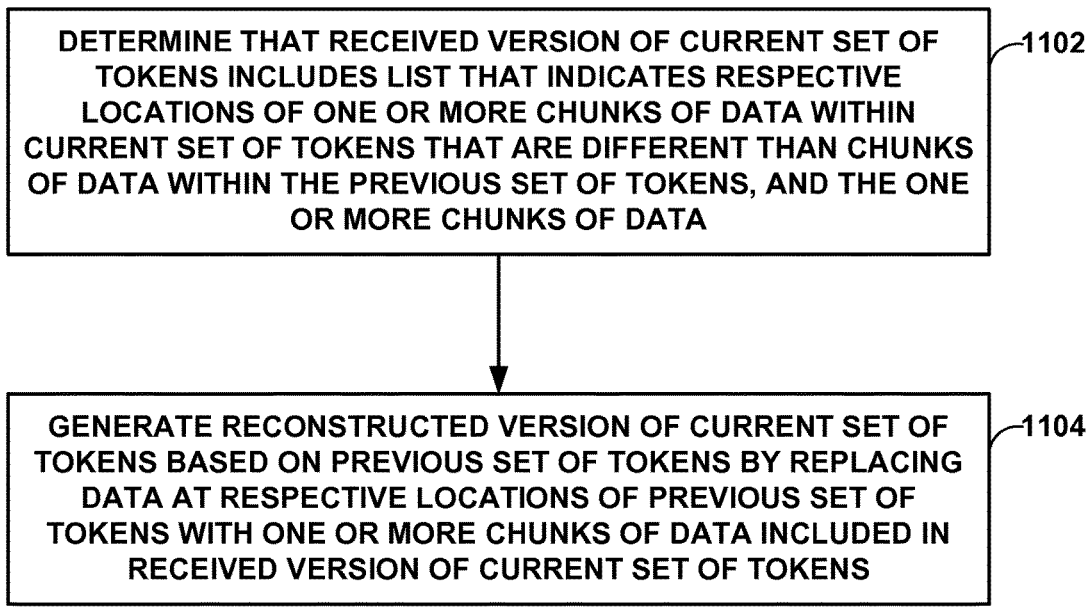
FIG. 11 is a flow diagram illustrating example operations of a sink device to perform frame based reconstruction on streaming video data received from a source device, in accordance with one or more techniques of the present disclosure.

FIG. 11 is a flow diagram illustrating example operations of a sink device to perform frame based reconstruction on streaming video data received from a source device, in accordance with one or more techniques of the present disclosure. The techniques of FIG. 11 may be performed by one or more processors of a computing device, such as sink device 6 illustrated in FIGS. 3 and 4. For purposes of illustration, the techniques of FIG. 11 are described within the context of sink device 6 illustrated in FIGS. 3 and 4, although computing devices having configurations different than that of sink device 6 may perform the techniques of FIG. 11.

As discussed above, in some examples, compression type module 61 may invoke frame based reconstruction module 62 to generate the uncompressed version of the current set of graphical command tokens using frame based reconstruction in accordance with the techniques of FIG. 11. When invoked to perform frame based reconstruction, frame based reconstruction module 62 may determine that the received version of the current set of graphical command tokens indicates a delta between the current set of graphical command tokens and a previous set of graphical command tokens. For instance, frame based reconstruction module 62 may determine that the received version of the current set of graphical command tokens includes a list that indicates respective locations of one or more chunks of data within the current set of graphical command tokens that are different than chunks of data within the previous set of graphical command tokens, and the one or more chunks of data (1102).

Frame based reconstruction module 62 may generate a reconstructed version of the current set of graphical command tokens based on the delta and the previous set of graphical command tokens. For instance, frame based reconstruction module 62 may generate the reconstructed version of the current set of graphical command tokens by replacing data at the respective locations of the previous set of graphical command tokens with the one or more chunks of data included in the received version of the current set of graphical command tokens (1104). Frame based reconstruction module 62 may output the reconstructed version of the current set of graphical command tokens to GPU 20 of sink device 6 to cause GPU 20 to render the frame of video data based on the reconstructed version of the current set of graphical command tokens. In this way, frame based reconstruction module 62 may reconstruct a set of graphical command tokens using frame based compression.

Figure 12:
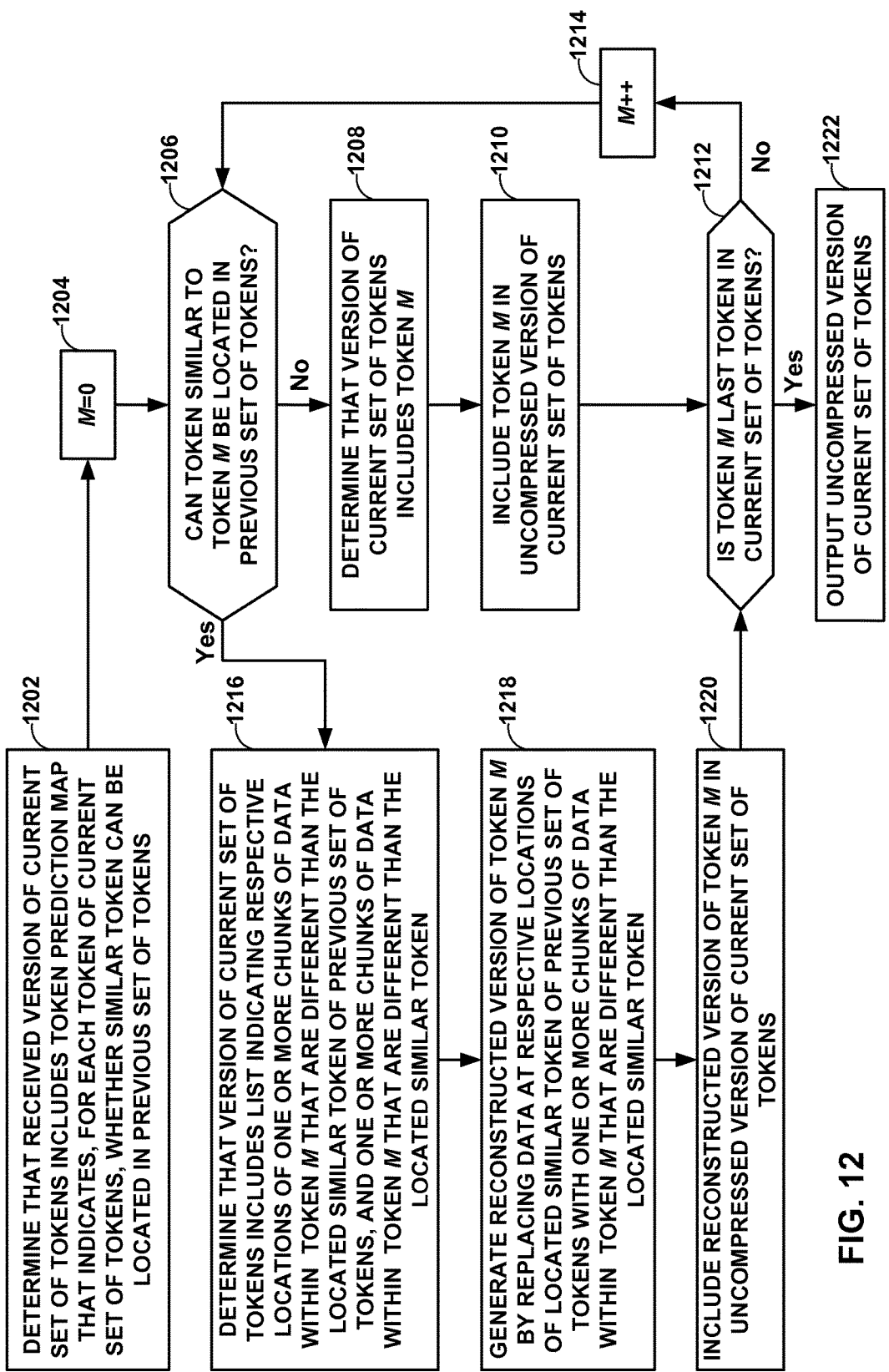
FIG. 12 is a flow diagram illustrating example operations of a sink device to perform token based reconstruction on streaming video data received from a source device, in accordance with one or more techniques of the present disclosure.

FIG. 12 is a flow diagram illustrating example operations of a sink device to perform token based reconstruction on streaming video data received from a source device, in accordance with one or more techniques of the present disclosure. The techniques of FIG. 12 may be performed by one or more processors of a computing device, such as sink device 6 illustrated in FIGS. 3 and 4. For purposes of illustration, the techniques of FIG. 12 are described within the context of sink device 6 illustrated in FIGS. 3 and 4, although computing devices having configurations different than that of sink device 6 may perform the techniques of FIG. 12.

As discussed above, and in some examples, compression type module 61 may invoke token based reconstruction module 64 to generate the uncompressed version of the current set of graphical command tokens using token based reconstruction in accordance with the techniques of FIG. 12. When invoked to perform token based reconstruction, token based reconstruction module 64 may determine that the received version of the current set of graphical command tokens includes a token prediction map that indicates, for each graphical command token of the current set of graphical command tokens, whether a similar graphical command token can be located in a previous set of graphical command tokens (1202). In some examples, the token prediction map may be encoded. For instance, the token prediction map [1, 2, 0, 0, 3, 7, 8, 10] may be encoded as a vector of non-zero values [1, 1, 0, 0, 1, 1, 1, 1] that indicates which graphical command tokens of the current set of graphical command tokens have similar graphical command tokens in the previous set of graphical command tokens, and a vector of differential non-zero values [1, 1, 1, 4, 1, 2] that can be combined with the vector of non-zero values to reconstruct the token prediction map. In some examples, the vector of differential non-zero values may be encoded using exponential Golomb coding (e.g., the vector of differential non-zero values [1, 1, 1, 4, 1, 2] may be encoded as "1", "1", "1", "00100", "1", "010").

Token based reconstruction module 64 may process a first graphical command token m by setting index value m to zero (1204). Token based reconstruction module 64 may determine, based on the token prediction map, whether a graphical command token similar to graphical command token m may be located in the previous set of graphical command tokens (1206). As one example, if an entry in the token prediction map is non-zero, token based reconstruction module 64 may determine that a graphical command token similar to graphical command token m can be located in the previous set of graphical command tokens. As another example, if an entry in the token prediction map is zero, token based reconstruction module 64 may determine that a graphical command token similar to graphical command token m cannot be located in the previous set of graphical command tokens.

If a graphical command token similar to graphical command token m cannot be located in the previous set of graphical command tokens ("No" branch of 1206), token based reconstruction module 64 may determine that the received version of the current set of graphical command tokens includes graphical command token m (1208). For instance, token based reconstruction module 64 may determine that the received version of the current set of graphical command tokens includes an uncompressed version of graphical command token m. Token based reconstruction module 64 may include token m in the uncompressed version of the current set of graphical command tokens (1210), and determine whether token m is the last graphical command token in the current set of graphical command tokens (1212).

If a graphical command token similar to graphical command token m can be located in the previous set of graphical command tokens ("Yes" branch of 1206), token based reconstruction module 64 may reconstruct graphical command token m using techniques similar to the frame based reconstruction techniques discussed above. For instance, token based reconstruction module 64 may determine that the received version of the current set of graphical command tokens includes a list indicating respective locations of one or more chunks of data within token m that are different than chunks of data within the located similar token of the previous set of graphical command tokens, and the one or more chunks of data within token m that are different than the chunks of data within the located similar token of the previous set of graphical command tokens (1216). Based on the list and the one or more chunks of data, token based reconstruction module 64 may generate a reconstructed version of token m by replacing data at the respective locations of the located similar graphical command token of the previous set of graphical command tokens with the one or more chunks of data within token m that are different than the located similar graphical command token (1218). Token based reconstruction module 64 may include the reconstructed version of graphical command token m in the uncompressed version of the current set of graphical command tokens (1220), and determine whether token m is the last graphical command token in the current set of graphical command tokens (1212).

In any case, if graphical command token m is not the last token in the current set of graphical command tokens ("No" branch of 1212), token based reconstruction module 64 may advance to a next graphical command token in the current set of graphical command tokens (1212) and determine whether a graphical command token similar to graphical command token m+1 may be located in the previous set of graphical command tokens (1206). If graphical command token m is the last token in the current set of graphical command tokens ("Yes" branch of 914), token based reconstruction module 64 may output the uncompressed version of the current set of graphical command tokens (1222). For instance, token based reconstruction module 64 may output the uncompressed version of the current set of graphical command tokens to GPU 20 of sink device 6 to cause GPU 20 to render the frame of video data based on the uncompressed version of the current set of graphical command tokens. In this way, token based reconstruction module 64 may reconstruct a set of graphical command tokens using token based compression.

Figure 13:
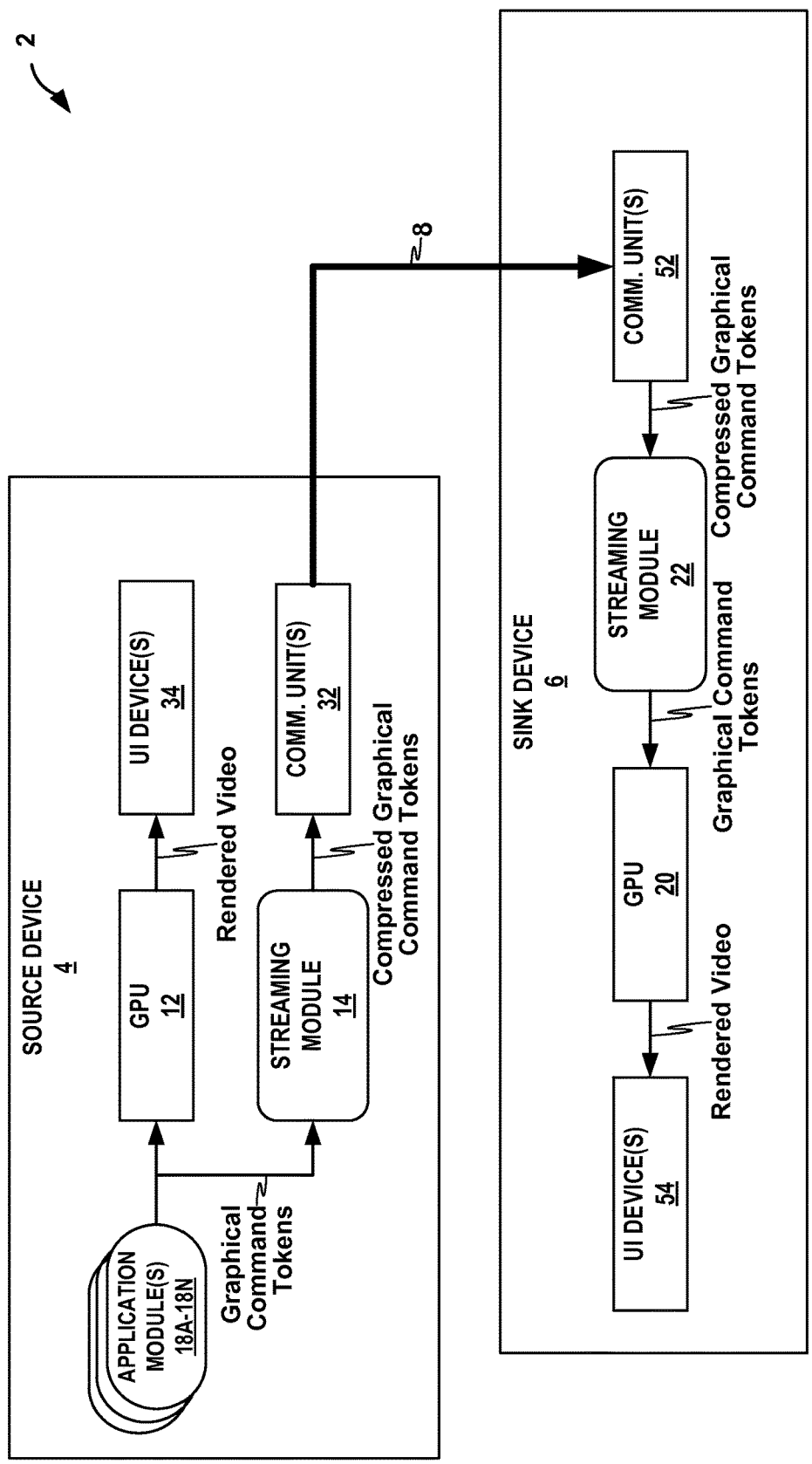
FIG. 13 is a conceptual diagram illustrating an example data flow within a WD system in which a source device is configured to transmit compressed graphical commands to a sink device over a communication channel, in accordance with one or more techniques of this disclosure.

FIG. 13 is a conceptual diagram illustrating an example data flow within a WD system in which a source device is configured to transmit compressed graphical commands to a sink device over a communication channel, in accordance with one or more techniques of this disclosure. In some examples, the data flow illustrated by FIG. 13 may correspond to a data flow within WD system 2 of FIGS. 3 and 4.

As illustrated in FIG. 13, one or more of application modules 18 of source device 4 may output graphical command tokens, e.g., to GPU 12. In some examples, GPU 12 may render the graphical command tokens into video data and output the rendered video to a display of UI devices 34. In some examples, GPU 12 may not render the graphical command tokens. In accordance with one or more techniques of this disclosure, streaming module 14 may capture the graphical command tokens at an input of GPU 12. Streaming module 14 may process the graphical command tokens and output compressed graphical command tokens to communication units 32. For instance, streaming module 14 may generate compressed graphical command tokens using one or both of frame-based encoding or token-based encoding. Communication units 32 may output the compressed graphical command tokens to communication units 52 of sink device 6.

Communication units 52 may output the received compressed graphical command tokens to streaming module 22. In accordance with one or more techniques of this disclosure, streaming module 22 may decompress the compressed graphical command tokens to generate graphical command tokens and output the generated graphical command tokens to GPU 20. GPU 20 may render the graphical command tokens received from streaming module 22 into rendered video and output the rendered video for display. For instance, GPU 20 may output the rendered video for display at a display of UI devices 54.

Figure 14:
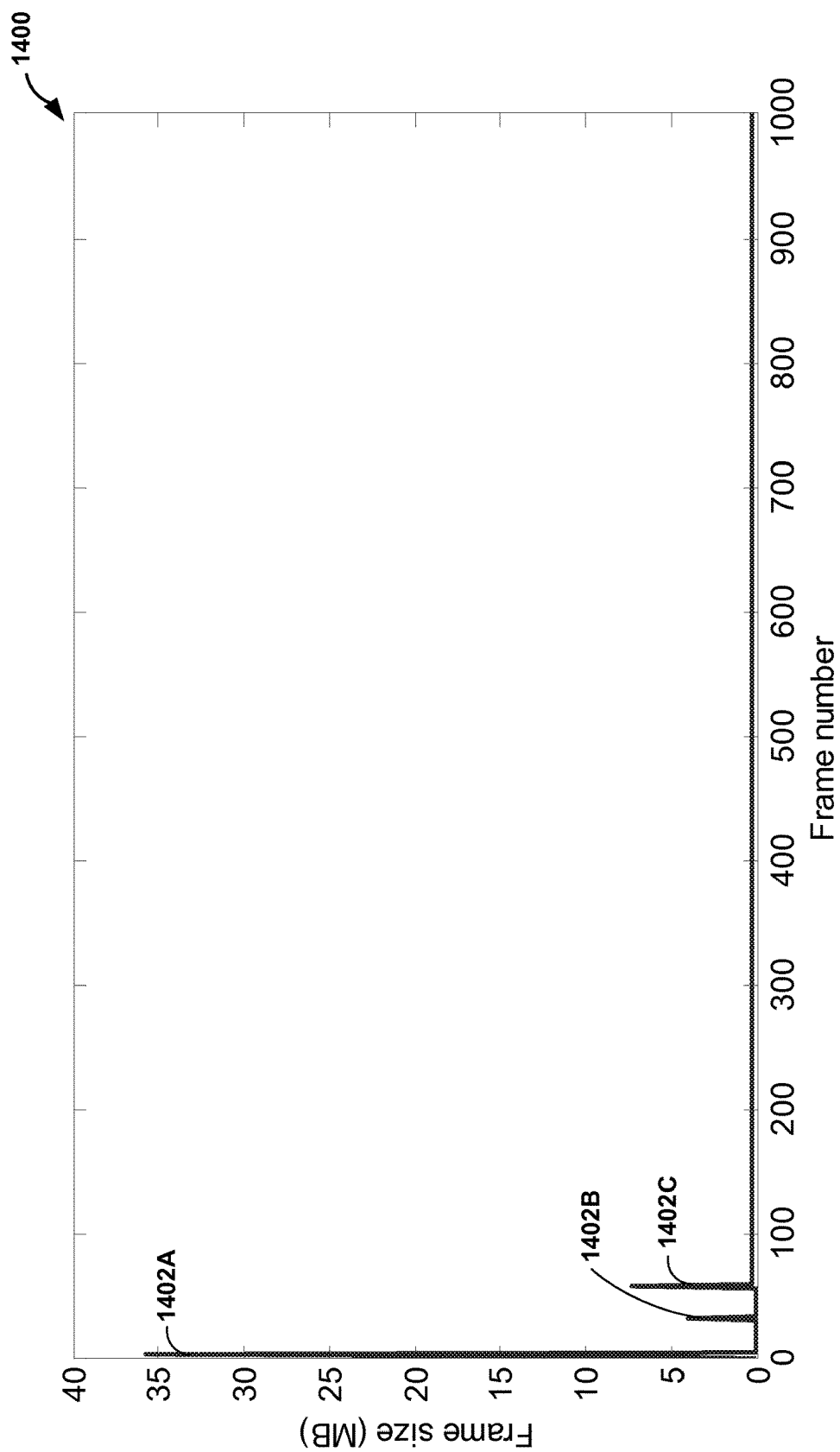
FIG. 14 is a graph illustrating a data rate as a function of frame number, in accordance with one more techniques of this disclosure.

FIG. 14 is a graph illustrating a data rate as a function of frame number, in accordance with one more techniques of this disclosure. In some examples, the data rate illustrated by graph 1400 of FIG. 14 may correspond to a rate at which a source device, such as source device 4 of FIGS. 3 and 4 may generate data for transfer to a sink device, such as sink device 6 of FIGS. 3 and 4, when transmitting video data as graphical command tokens and texture elements.

In some examples, peaks 1402A-1402C (collectively, "peaks 1402") may correspond to frames which include texture elements. For instance, frame numbers 1, 25, and 50 may include texture elements. In the example of FIG. 14, the total amount of data used to transmit the texture elements may be approximately 77 MB.

As discussed above, in addition to transmitting texture elements, the source device also transmits graphical command tokens. For instance, frame numbers 51 through 1000 may include sets of graphical command tokens. In the example of FIG. 14, the total amount of data used to transmit the sets of graphical command tokens may be approximately 242 MB. As such, while transmitting texture elements may cause spikes in the data rate, transmitting the graphical command tokens may heavily contribute to the overall amount of data transmitted.

In accordance with one or more techniques of this disclosure, a source device may implement one or more compression techniques to reduce the amount of data required to transmit the graphical command tokens. For instance, a source device may implement one or more compression techniques in accordance with the techniques of FIGS. 7-9. Similarly, a sink device may implement one or more complimentary decompression techniques in accordance with the techniques of FIGS. 10-12. In this way, the source device and the sink device may reduce the amount of data required to transmit the graphical command tokens.

Figure 15:
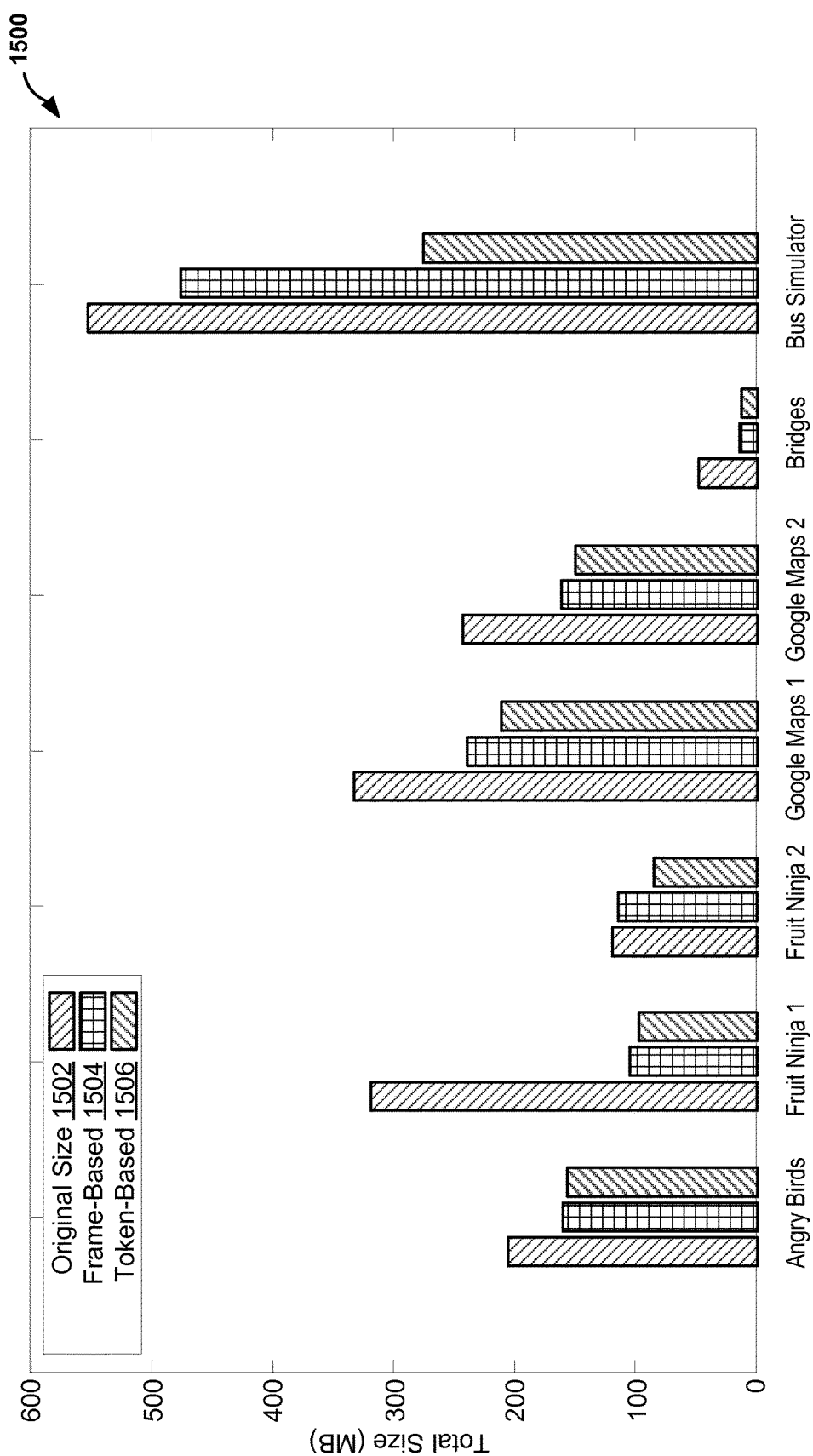
FIG. 15 is a graph illustrating amounts of data used to stream video data for a plurality of applications using varying compression techniques, in accordance with one more techniques of this disclosure.

FIG. 15 is a graph illustrating amounts of data used to stream video data for a plurality of applications using varying compression techniques, in accordance with one more techniques of this disclosure. In some examples, original size 1502 data illustrated by graph 1500 of FIG. 15 may correspond to amounts of data used by a source device to stream video data for a plurality of applications (i.e., "Angry Birds," "Fruit Ninja 1," "Fruit Ninja 2," "Google Maps 1," "Google Maps 2," "Bridges," and "Bus Simulator") without compressing graphical command tokens. In some examples, frame-based 1504 data illustrated by graph 1500 of FIG. 15 may correspond to amounts of data used by a source device to stream video data for the plurality of applications using frame based compression techniques to compress graphical command tokens. In some examples, token-based 1506 data illustrated by graph 1500 of FIG. 15 may correspond to amounts of data used by a source device to stream video data for the plurality of applications using frame based and token based compression techniques to compress graphical command tokens. As shown by FIG. 15, by compressing graphical command tokens with one or both of frame based techniques and token based techniques, a source device may reduce the amount of data used to stream video data to a sink device.

Figure 16:
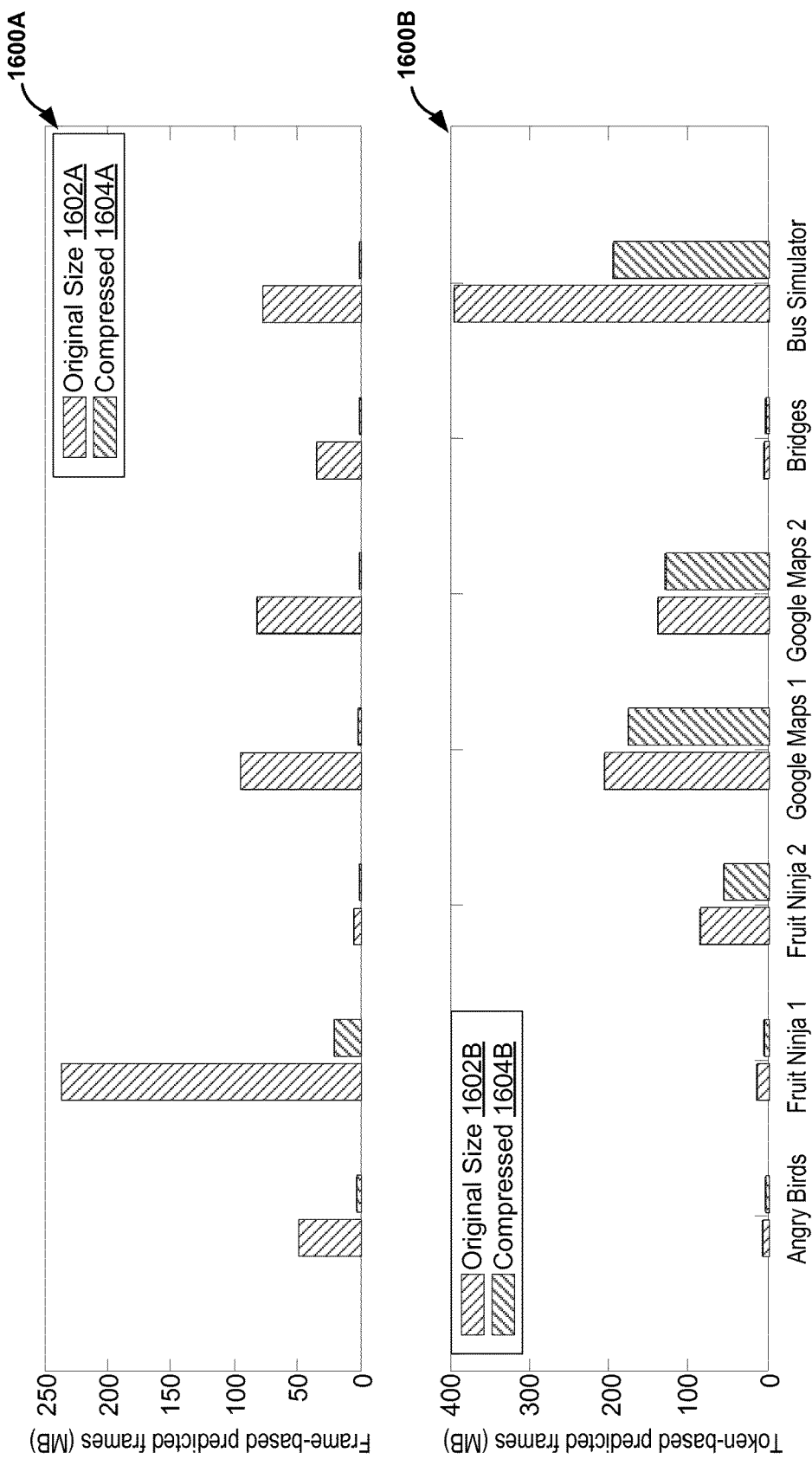
FIG. 16 is a graph illustrating amounts of data used to stream video data for a plurality of applications using varying compression techniques, in accordance with one more techniques of this disclosure.

FIG. 16 is a graph illustrating amounts of data used to stream video data for a plurality of applications using varying compression techniques, in accordance with one more techniques of this disclosure. Graph 1600A of FIG. 16 illustrates different amounts of data used by a source device to transmit a first subset of frames of video data for a plurality of applications (i.e., "Angry Birds," "Fruit Ninja 1," "Fruit Ninja 2," "Google Maps 1," "Google Maps 2," "Bridges," and "Bus Simulator"). For instance, original size 1602A indicates the amount of data used by the source device to stream the first subset of frames without compressing graphical command tokens, and compressed data 1604A indicates the amount of data used by the source device to stream the first subset of frames with frame-based graphical command token compression.

Graph 1600B of FIG. 16 illustrates different amounts of data used by a source device to stream a second subset of frames of video data for the plurality of applications. For instance, original size 1602B indicates the amount of data used by the source device to transmit the second subset of frames without compressing graphical command tokens, and compressed data 1604B indicates the amount of data used by the source device to stream the second subset of frames with token-based graphical command token compression.

The video data may also include a third subset of frames that are transmitted without compression. For instance, the third subset of frames may include a first frame of the video data, and frames of the video data that are not sufficiently similar to previous frames of the video data to perform token based compression. Together, the amounts of data used to transmit the first subset of data illustrated by graph 1600A, the second subset of data illustrated by graph 1600B, and the third subset of data may equal the amounts of data illustrated by FIG. 15.

The following examples may illustrate one or more techniques of the disclosure:

Example 1

A method for transmitting video data comprising: capturing a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, outputting, by a source device and to a sink device, a compressed version of the current set of graphical command tokens.

Example 2

The method of example 1, wherein the compressed version of the current set of graphical command tokens includes: a list indicating respective locations of one or more chunks of data within the current set of graphical command tokens that are different than the previous set of graphical command tokens, and the one or more chunks of data.

Example 3

The method of any combination of examples 1-2, wherein the list is encoded using exponential Golomb coding.

Example 4

The method of any combination of examples 1-3, further comprising: responsive to determining that a length of the current set of graphical command tokens is different than the length of the previous set of graphical command tokens, outputting, by the source device and to the sink device an uncompressed version of the current set of graphical command tokens.

Example 5

The method of any combination of examples 1-4, wherein the compressed version of the current set of graphical command tokens is a first compressed version, the method further comprising: responsive to determining that a length of the current set of graphical command tokens is different than the length of the previous set of graphical command tokens: determining a token prediction map that indicates, for each graphical command token of the current set of graphical command tokens, whether a similar graphical command token can be located in the previous set of graphical command tokens; responsive to determining, based on the token prediction map, that the current set of graphical command tokens is sufficiently similar to the previous set of graphical command tokens, outputting, by the source device and to the sink device, a second compressed version of the current set of graphical command tokens; and responsive to determining, based on the token prediction map, that the current set of graphical command tokens is not sufficiently similar to the previous set of graphical command tokens, outputting, by the source device and to the sink device, an uncompressed version of the current set of graphical command tokens.

Example 6

The method of any combination of examples 1-5, wherein determining whether the current set of graphical command tokens is sufficiently similar to the previous set of graphical command tokens comprises: determining a percentage of graphical command tokens of the current set of graphical command tokens for which a similar graphical command token can be located in the previous set of graphical command tokens; and responsive to determining that the percentage satisfies a threshold percentage, determining that the current set of graphical command tokens is sufficiently similar to the previous set of graphical command tokens.

Example 7

The method of any combination of examples 1-6, wherein the second compressed version of the current set of graphical command tokens includes: the token prediction map, for each respective graphical command token of the current set of graphical command tokens for which a similar graphical command token cannot be located in the previous set of graphical command tokens, the respective graphical command token, and for each respective graphical command token of the current set of graphical command tokens for which a similar graphical command token can be located in the previous set of graphical command tokens: a list indicating respective locations of one or more chunks of data within the respective graphical command token that are different than the located similar graphical command token of the previous set of graphical command tokens, and the one or more chunks of data within the respective token that are different than the located similar graphical command token.

Example 8

The method of any combination of examples 1-7, further comprising determining, for a particular graphical command token of the current set of graphical command tokens, that a similar graphical command token can be located in the previous set of graphical command tokens where a particular graphical command token of the previous set of graphical command tokens has: a same token type as the particular graphical command token of the current set of graphical command tokens, and a same token data size as the particular graphical command token of the current set of graphical command tokens.

Example 9

The method of any combination of examples 1-8, further comprising outputting, by the source device and to the sink device, an indication of a compression status of the current set of graphical command tokens.

Example 10

A source device comprising: a memory; one or more processors; and at least one module executable by the one or more processors to: capture a plurality of sets of graphical command tokens respectively renderable into a plurality of frames of video data; and responsive to determining that a length of a current set of graphical command tokens of the plurality of sets of graphical command tokens is the same as a length of a previous set of the plurality of sets of graphical command tokens, output, to a sink device a compressed version of the current set of graphical command tokens.

Example 11

The source device of example 10, wherein the at least one module is further executable by the at least one processors to perform any combination of the method of examples 1-9.

Example 12

A source device comprising means for performing any combination of the method of examples 1-9.

Example 13

A computer-readable storage medium storing instructions that, when executed, cause one or more processors of a source device to perform any combination of the method of examples 1-9.

Example 14

A method for receiving video data comprising: receiving, by a sink device and from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; responsive to determining, based on the indication of the compression status, that the version of the current set of graphical command tokens is compressed using frame based compression, generating a reconstructed version of the current set of graphical command tokens based on the previous set of graphical command tokens and a received delta between the current set of graphical command tokens and a previous set of graphical command tokens of the plurality of sets of graphical command tokens; and rendering a frame of video data based on the reconstructed version of the current set of graphical command tokens.

Example 15

The method of example 14, wherein the received version of the current set of graphical command tokens is compressed using frame based compression where a length of the current set of graphical command tokens is the same as a length of the previous set of graphical command tokens.

Example 16

The method of any combination of examples 14-15, wherein the received version of the current set of graphical command tokens is uncompressed where a length of the current set of graphical command tokens is different than a length of the previous set of graphical command tokens.

Example 17

The method of any combination of examples 14-16, wherein: the delta between the current set of graphical command tokens and the previous set of graphical command tokens includes: a list indicating respective locations of one or more chunks of data within the current set of graphical command tokens that are different than chunks of data within the previous set of graphical command tokens of the plurality of sets of graphical command tokens, and the one or more chunks of data, and generating the reconstructed version of the current set of graphical commands comprises replacing data at the respective locations of the previous set of graphical command tokens with the one or more chunks of data included in the compressed version of the current set of graphical command tokens.

Example 18

The method of any combination of examples 14-17, further comprising, responsive to determining, based on the indication of the compression status, that the version of the current set of graphical command tokens is compressed using token based compression: determining that the version of the current set of graphical command tokens indicates respective deltas between respective graphical command tokens of the current set of graphical command tokens and similar graphical command tokens of a previous set of graphical command tokens; and generating reconstructed versions of respective graphical command tokens of the current set of graphical command tokens based on the previous set of graphical command tokens and the respective deltas.

Example 19

The method of any combination of examples 14-18, wherein the version of the current set of graphical command tokens further includes a token prediction map that indicates, for each graphical command token of the current set of graphical command tokens, whether a similar graphical command token can be located in the previous set of graphical command tokens, for each respective graphical command token of the current set of graphical command tokens for which the token prediction map indicates that a similar graphical command token cannot be located in the previous set of graphical command tokens, the version of the current set of graphical command tokens further includes the respective graphical command token, and for each respective graphical command token of the current set of graphical command tokens for which the token prediction map indicates that a similar graphical command token can be located in the previous set of graphical command tokens, the delta for the respective graphical command token includes: a list indicating respective locations of one or more chunks of data within the respective graphical command token that are different than the located similar graphical command token of the previous set of graphical command tokens, and the one or more chunks of data within the respective token that are different than the located similar graphical command token.

Example 20

The method of any combination of examples 14-19, wherein the current set of graphical command tokens is compressed using token based compression where the current set of graphical command tokens is sufficiently similar to the previous set of graphical command tokens.

Example 21

The method of any combination of examples 14-20, wherein the received version of the current set of graphical command tokens is uncompressed where the current set of graphical command tokens is not sufficiently similar to the previous set of graphical command tokens.

Example 22

A sink device comprising: a memory; one or more processors; and at least one module executable by the one or more processors to: receive, from a source device, a version of a current set of graphical command tokens and an indication of a compression status of the current set of graphical command tokens, wherein the current set of graphical command tokens is from a plurality of sets of graphical command tokens respectively renderable into a plurality of frames of video data; responsive to determining, based on the indication of the compression status, that the version of the current set of graphical command tokens is compressed using frame based compression, generate a reconstructed version of the current set of graphical command tokens based on the previous set of graphical command tokens and a received delta between the current set of graphical command tokens and a previous set of graphical command tokens of the plurality of sets of graphical command tokens; and render a frame of video data based on the reconstructed version of the current set of graphical command tokens.

Example 23

The sink device of example 22, wherein the at least one module is further executable by the one or more processors to perform any combination of the method of examples 12-19.

Example 24

A sink device comprising means for performing any combination of the method of examples 12-19.

Example 25

A computer-readable storage medium storing instructions that, when executed, cause one or more processors of a sink device to perform any combination of the method of examples 12-19.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for transmitting video data comprising:
    capturing a plurality of sets of graphical command tokens respectively renderable into a plurality of frames of video data; and
    responsive to determining that a length of a current set of graphical command tokens of the plurality of sets of graphical command tokens is different than a length of a previous set of the plurality of sets of graphical command tokens:
        determining a token prediction map that indicates, for each graphical command token of the current set of graphical command tokens, whether a similar graphical command token can be located in the previous set of graphical command tokens; and
        responsive to determining, based on the token prediction map, that the current set of graphical command tokens is sufficiently similar to the previous set of graphical command tokens, outputting, by a source device and to a sink device, a compressed version of the current set of graphical command tokens.

2. The method of claim 1, further comprising:
    responsive to determining, based on the token prediction map, that a second current set of graphical command tokens is not sufficiently similar to a second previous set of graphical command tokens, outputting, by the source device and to the sink device, an uncompressed version of the second current set of graphical command tokens.

3. The method of claim 1, wherein determining whether the current set of graphical command tokens is sufficiently similar to the previous set of graphical command tokens comprises:
    determining a percentage of graphical command tokens of the current set of graphical command tokens for which a similar graphical command token can be located in the previous set of graphical command tokens; and
    responsive to determining that the percentage satisfies a threshold percentage, determining that the current set of graphical command tokens is sufficiently similar to the previous set of graphical command tokens.

4. The method of claim 1, wherein the compressed version of the current set of graphical command tokens includes:
    the token prediction map,
    for each respective graphical command token of the current set of graphical command tokens for which a similar graphical command token cannot be located in the previous set of graphical command tokens, the respective graphical command token, and
    for each respective graphical command token of the current set of graphical command tokens for which a similar graphical command token can be located in the previous set of graphical command tokens:
        a list indicating respective locations of one or more chunks of data within the respective graphical command token that are different than the located similar graphical command token of the previous set of graphical command tokens, and
        the one or more chunks of data within the respective token that are different than the located similar graphical command token.

5. The method of claim 4, further comprising determining, for a particular graphical command token of the current set of graphical command tokens, that a similar graphical command token can be located in the previous set of graphical command tokens where a particular graphical command token of the previous set of graphical command tokens has:
    a same token type as the particular graphical command token of the current set of graphical command tokens, and
    a same token data size as the particular graphical command token of the current set of graphical command tokens.

6. The method of claim 1, further comprising outputting, by the source device and to the sink device, an indication of a compression status of the current set of graphical command tokens.

7. The method of claim 1, further comprising:
    responsive to determining that a length of a second current set of graphical command tokens is the same as a length of a second previous set of graphical command tokens, outputting, by the source device and to the sink device, a compressed version of the second current set of graphical command tokens.

8. The method of claim 7, wherein the second compressed version of the current set of graphical command tokens includes:
- a list indicating respective locations of one or more chunks of data within the current set of graphical command tokens that are different than the previous set of graphical command tokens, and
- the one or more chunks of data.

9. The method of claim 8, wherein the list is encoded using exponential Golomb coding.

10. A source device comprising:
- a memory;
- one or more processors; and
- at least one module executable by the one or more processors to:
  - capture a plurality of sets of graphical command tokens respectively renderable into a plurality of frames of video data; and
  - responsive to determining that a length of a current set of graphical command tokens of the plurality of sets of graphical command tokens is different than a length of a previous set of the plurality of sets of graphical command tokens:
    - determine a token prediction map that indicates, for each graphical command token of the current set of graphical command tokens, whether a similar graphical command token can be located in the previous set of graphical command tokens; and
    - responsive to determining, based on the token prediction map, that the current set of graphical command tokens is sufficiently similar to the previous set of graphical command tokens, output, to a sink device, a compressed version of the current set of graphical command tokens.

11. The source device of claim 10, wherein, responsive to determining, based on the token prediction map, that the current set of graphical command tokens is not sufficiently similar to the previous set of graphical command tokens, the at least one module is executable by the one or more processors to output, to the sink device, an uncompressed version of the current set of graphical command tokens.

12. The source device of claim 10, wherein the at least one module is executable by the one or more processors to determine whether the current set of graphical command tokens is sufficiently similar to the previous set of graphical command tokens by at least:
- determining a percentage of graphical command tokens of the current set of graphical command tokens for which a similar graphical command token can be located in the previous set of graphical command tokens; and
- responsive to determining that the percentage satisfies a threshold percentage, determining that the current set of graphical command tokens is sufficiently similar to the previous set of graphical command tokens.

13. The source device of claim 10, wherein the compressed version of the current set of graphical command tokens includes:
- the token prediction map,
- for each respective graphical command token of the current set of graphical command tokens for which a similar graphical command token cannot be located in the previous set of graphical command tokens, the respective graphical command token, and
- for each respective graphical command token of the current set of graphical command tokens for which a similar graphical command token can be located in the previous set of graphical command tokens:
  - a list indicating respective locations of one or more chunks of data within the respective graphical command token that are different than the located similar graphical command token of the previous set of graphical command tokens, and
  - the one or more chunks of data within the respective token that are different than the located similar graphical command token.

14. The source device of claim 13, wherein the at least one module is further executable by the one or more processors to determine, for a particular graphical command token of the current set of graphical command tokens, that a similar graphical command token can be located in the previous set of graphical command tokens where a particular graphical command token of the previous set of graphical command tokens has:
- a same token type as the particular graphical command token of the current set of graphical command tokens, and
- a same token data size as the particular graphical command token of the current set of graphical command tokens.

15. The source device of claim 10, wherein the at least one module is further executable by the one or more processors to output, to the sink device, an indication of a compression status of the current set of graphical command tokens.

16. The source device of claim 10, wherein, responsive to determining that a length of a second current set of graphical command tokens is the same as a length of a second previous set of graphical command tokens, the at least one module is executable by the one or more processors to output, to the sink device, a compressed version of the second current set of graphical command tokens.

17. The source device of claim 16, wherein the compressed version of the second current set of graphical command tokens includes:
- a list indicating respective locations of one or more chunks of data within the second current set of graphical command tokens that are different than the second previous set of graphical command tokens, and
- the one or more chunks of data.

18. The source device of claim 17, wherein the list is encoded using exponential Golomb coding.

19. A method for receiving video data comprising:
- receiving, by a sink device and from a source device, a version of a current set of graphical command tokens and an indication of a compression status of the current set of graphical command tokens, wherein the current set of graphical command tokens is from a plurality of sets of graphical command tokens respectively renderable into a plurality of frames of video data;
- responsive to determining, based on the indication of the compression status, that the version of the current set of graphical command tokens is compressed using token based compression:
  - determining that the version of the current set of graphical command tokens indicates respective deltas between respective graphical command tokens of the current set of graphical command tokens and similar graphical command tokens of a previous set of graphical command tokens, wherein:
    - the version of the current set of graphical command tokens further includes a token prediction map that indicates, for each graphical command token of the current set of graphical command tokens, whether a similar graphical command token can be located in the previous set of graphical command tokens, for each respective graphical command token of the current set of graphical command tokens for which the token prediction map indicates that a similar graphical command token cannot be located in the previous set of graphical command tokens, the version of the current set of graphical command tokens further includes the respective graphical command token, and for each respective graphical command token of the current set of graphical command tokens for which the token prediction map indicates that a similar graphical command token can be located in the previous set of graphical command tokens, the delta for the respective graphical command token includes:

a list indicating respective locations of one or more chunks of data within the respective graphical command token that are different than the located similar graphical command token of the previous set of graphical command tokens, and the one or more chunks of data within the respective token that are different than the located similar graphical command token; and generating reconstructed versions of respective graphical command tokens of the current set of graphical command tokens based on the previous set of graphical command tokens and the respective deltas; and rendering a frame of video data based on the reconstructed version of the current set of graphical command tokens.

20. The method of claim 19, wherein the current set of graphical command tokens is compressed using token based compression when the current set of graphical command tokens is sufficiently similar to the previous set of graphical command tokens.

21. The method of claim 20, wherein a received version of a second current set of graphical command tokens is uncompressed when the second current set of graphical command tokens is not sufficiently similar to a second previous set of graphical command tokens.

22. The method of claim 19, further comprising:

responsive to determining, based on an indication of compression status for a second current set of graphical command tokens, that a received version of the second current set of graphical command tokens is compressed using frame based compression, generating a reconstructed version of the second current set of graphical command tokens based on a second previous set of graphical command tokens and a received delta between the second current set of graphical command tokens and the second previous set of graphical command tokens of the plurality of sets of graphical command tokens, wherein the received version of the second current set of graphical command tokens is compressed using frame based compression when a length of the second current set of graphical command tokens is the same as a length of the second previous set of graphical command tokens.

23. The method of claim 22, wherein, when the version of the second current set of graphical command tokens is compressed using frame based compression:

the delta between the second current set of graphical command tokens and the second previous set of graphical command tokens includes: a list indicating respective locations of one or more chunks of data within the second current set of graphical command tokens that are different than chunks of data within the second previous set of graphical command tokens of the plurality of sets of graphical command tokens, and the one or more chunks of data, and generating a reconstructed version of the second current set of graphical commands comprises replacing data at the respective locations of the second previous set of graphical command tokens with the one or more chunks of data included in the compressed version of the second current set of graphical command tokens.

24. The method of claim 19, wherein rendering the frame of video data based on the reconstructed version of the current set of graphical command tokens comprises:

rendering, by a graphical processing unit (GPU) of the sink device, the frame of video data based on the reconstructed version of the current set of graphical command tokens.

25. A sink device comprising:

a memory;

one or more processors; and at least one module executable by the one or more processors to:

receive, from a source device, a version of a current set of graphical command tokens and an indication of a compression status of the current set of graphical command tokens, wherein the current set of graphical command tokens is from a plurality of sets of graphical command tokens respectively renderable into a plurality of frames of video data;

responsive to determining, based on the indication of the compression status, that the version of the current set of graphical command tokens is compressed using token based compression:

determine that the version of the current set of graphical command tokens indicates respective deltas between respective graphical command tokens of the current set of graphical command tokens and similar graphical command tokens of a previous set of graphical command tokens, wherein:

the version of the current set of graphical command tokens further includes a token prediction map that indicates, for each graphical command token of the current set of graphical command tokens, whether a similar graphical command token can be located in the previous set of graphical command tokens, for each respective graphical command token of the current set of graphical command tokens for which the token prediction map indicates that a similar graphical command token cannot be located in the previous set of graphical command tokens, the version of the current set of graphical command tokens further includes the respective graphical command token, and for each respective graphical command token of the current set of graphical command tokens for which the token prediction map indicates that a similar graphical command token can be located in the previous set of graphical command tokens, the delta for the respective graphical command token includes:

a list indicating respective locations of one or more chunks of data within the respective graphical command token that are different than the located similar graphical command token of the previous set of graphical command tokens, and the one or more chunks of data within the respective token that are different than the located similar graphical command token; and generate reconstructed versions of respective graphical command tokens of the current set of graphical command tokens based on the previous set of graphical command tokens and the respective deltas; and render a frame of video data based on the reconstructed version of the current set of graphical command tokens.

26. The sink device of claim 25, wherein, responsive to determining, based on an indication of compression status for a second current set of graphical command tokens, that a received version of the second current set of graphical command tokens is compressed using frame based compression, the at least one module is further executable by the one or more processors to generate a reconstructed version of the second current set of graphical command tokens based on a second previous set of graphical command tokens and a received delta between the second current set of graphical command tokens and the second previous set of graphical command tokens of the plurality of sets of graphical command tokens, wherein the received version of the second current set of graphical command tokens is compressed using frame based compression where a length of the second current set of graphical command tokens is the same as a length of the second previous set of graphical command tokens.

27. The sink device of claim 26, wherein, where the version of the current set of graphical command tokens is compressed using frame based compression:

the delta between the current set of graphical command tokens and the previous set of graphical command tokens includes: a list indicating respective locations of one or more chunks of data within the current set of graphical command tokens that are different than chunks of data within the previous set of graphical command tokens of the plurality of sets of graphical command tokens, and the one or more chunks of data, and the at least one module is executable by the one or more processors to generate the reconstructed version of the current set of graphical commands by at least replacing data at the respective locations of the previous set of graphical command tokens with the one or more chunks of data included in the compressed version of the current set of graphical command tokens.

28. The sink device of claim 25, wherein the one or more processors include at least one graphical processing unit (GPU) configured to render the frame of video data based on the reconstructed version of the current set of graphical command tokens.

* * * * *